United States Patent [19]
Walls et al.

[11] Patent Number: 5,285,699
[45] Date of Patent: Feb. 15, 1994

[54] REINFORCED COMPOSITE FLYWHEELS AND SHAFTS

[75] Inventors: W. Alan Walls; Elvin Estes; Steve M. Manifold; Michael L. Spann; John H. Gully, all of Austin, Tex.

[73] Assignee: Board of Regents, University of Texas System, Austin, Tex.

[21] Appl. No.: 840,737

[22] Filed: Feb. 21, 1992

Related U.S. Application Data

[60] Continuation-in-part of Ser. No. 577,478, Sep. 4, 1990, abandoned, which is a division of Ser. No. 281,188, Dec. 7, 1988, Pat. No. 4,996,016.

[51] Int. Cl.$^5$ .......................... G05G 1/10; F16F 15/22
[52] U.S. Cl. .......................................... 74/572; 74/574; 74/573 R
[58] Field of Search ................................. 74/572–574

[56] References Cited

U.S. PATENT DOCUMENTS

| | | | |
|---|---|---|---|
| 3,299,735 | 1/1967 | Stott | 74/572 |
| 3,457,624 | 7/1969 | Sullivan et al. | 29/407 |
| 3,608,049 | 9/1971 | Tavella | 264/229 |
| 4,102,221 | 7/1978 | Hatch | 74/572 |
| 4,131,701 | 12/1978 | VanAuken | 428/36 |
| 4,138,286 | 2/1979 | Chevrolat et al. | 156/172 |
| 4,153,656 | 5/1979 | Bunyan | 264/262 |
| 4,171,626 | 10/1979 | Yates et al. | 64/1 |
| 4,173,128 | 11/1979 | Corvelli | 64/1 |
| 4,186,623 | 2/1980 | Friedericy et al. | 74/572 |
| 4,198,878 | 4/1980 | Lewis et al. | 74/572 |
| 4,200,831 | 4/1980 | Weldon et al. | 322/8 |
| 4,207,778 | 6/1980 | Hatch | 74/572 |
| 4,238,540 | 12/1980 | Yates et al. | 428/36 |
| 4,358,284 | 11/1982 | Federmann et al. | 464/181 |
| 4,434,125 | 2/1984 | Lavender et al. | 264/262 |
| 4,483,214 | 11/1984 | Mayer | 74/572 |
| 4,537,091 | 8/1985 | Kulkarni et al. | 74/572 |
| 4,569,114 | 2/1986 | Ashcombe et al. | 29/525 |
| 4,605,385 | 8/1986 | Puck et al. | 464/181 |
| 4,660,435 | 4/1987 | Davis et al. | 74/572 |
| 4,664,644 | 5/1987 | Kumata et al. | 464/180 |
| 4,935,708 | 6/1990 | Weldon et al. | 322/62 |
| 4,996,016 | 2/1991 | Walls et al. | 264/229 |

FOREIGN PATENT DOCUMENTS

| | | | |
|---|---|---|---|
| 292832 | 6/1971 | U.S.S.R. | 264/262 |
| 1080905 | 8/1967 | United Kingdom | 264/229 |

OTHER PUBLICATIONS

Walls and Manifold, "Applications of Lightweight Composite Materials In Pulsed Rotating Electrical Generators", Center For Electromechanics, The University of Texas at Austin.

Hashin Z., "Failure Criteria for Unidirectional Fiber Composites," *Journal of Applied Mechanics*, vol. 47, 1980, p. 329.

(List continued on next page.)

*Primary Examiner*—Vinh T. Luong
*Attorney, Agent, or Firm*—Arnold, White & Durkee

[57] ABSTRACT

The maximum safe operating speed or flywheels and shafts made of low tensile strength material is often determined by the speed at which radial tensile stress exceeds a radial tensile stress limit for the material. Circumferentially wound fiber composite material, for example, has a relatively low tensile strength along the radial direction perpendicular to the fibers. To increase the maximum safe operating speed, it is therefore desirable to form a fiber composite flywheel or shaft with radial compressive prestress. Such a prestressed flywheel or shaft has an outer annulus and an inner cylinder disposed in the outer annulus, and an annular layer of solidified bonding agent within an annular region between the outer annulus and the inner cylinder, wherein the outer annulus and the inner cylinder include substantial radial prestress induced by the bonding agent. The rim portion of a flywheel, for example, is formed from an outer ring (the annulus) and an inner ring (the cylinder, which is hollow in this case). Large, thick flywheels preferably have multiple cylindrical sections joined by such layers of bonding agent, and a plurality of the cylindrical sections each including an outer layer of relatively stiff fiber-composite material, and an inner layer of relatively compliant fiber-composite material within an integral matrix material.

35 Claims, 19 Drawing Sheets

OTHER PUBLICATIONS

S. B. Pratap, "Future Trends For Compulsators Driving Railguns," 3rd Symposium on Electromagnetic Launch Technology, 1986, Austin, Tex., Apr. 20–24, 1986, I.E.E.E. Transactions on Magnetics, vol. MAG-22, No. 6, Nov. 1986.

M. D. Driga et al., "Advanced Compulsator Design," 4th Symposium on Electromagnetic Launch Technology, 1988, Austin, Tex., Apr. 12–14, 1988, I.E.E.E. Publication No. 0018-9464/89/0100–0142501.00, 1989.

J. R. Kitzmiller et al., "Design of a 660 MW pulsed air–core Compulsator," 1990 International Conference on Electric Machines, MIT, Cambridge, Mass., Aug. 13–15, 1990.

W. A. Walls et al., "Design of a 20 GW, Self-Excited, Air-Core Compensated Pulsed Alternator Railgun Power Supply," 1990 International Conference on Electric Machines, MIT, Cambridge, Mass., Aug. 13–15, 1990.

W. A. Walls et al., "Design of a Field Based, Self-Excited Compulsator Power Supply For a 9 MJ Railgun Demonstrator," 5th Symposium on Electromagnetic Launch Technology, Elgin AFB, Fla., Apr. 2–5, 1990.

REINFORCED COMPOSITE FLYWHEELS AND SHAFTS

The United States Government may have rights in the invention pursuant to funding arrangements with the Department of Defense.

RELATED APPLICATIONS

The present application is a continuation-in-part of U.S. patent application Ser. No. 07/577,478, filed Sep. 4, 1990, now abandoned which is a divisional of U.S. patent application Ser. No. 281,188, filed Dec. 7, 1988 and issued as U.S. Pat. No. 4,996,016 on Feb. 26, 1991.

BACKGROUND OF THE INVENTION

1. Field of the Invention

This invention relates generally to flywheels, shafts, and rotors for rotating electrical machinery, and more particularly to fiber-reinforced composite flywheels, shafts, and rotors for rotating electrical machinery.

2. Description of the Related Art

In the field of electrical pulsed power generation, generators with increased power and energy storage capability are needed to satisfy a host of new applications. Laboratory electromagnetic accelerator experiments, such as impact fusion studies, require reliable high power sources, while other concepts, such as space launchers, may demand stored energies in the gigajoule range.

As described in Walls & Manifold, "Applications of Lightweight Composite Materials in Pulsed Rotating Electrical Generators," 6th IEEE Pulsed Power Conference, Arlington, Va. (Jun. 29–Jul. 1, 1987), flywheels are attached to the rotors of pulsed power generators to increase energy storage capabilities. Flywheels function as reservoirs which store rotational kinetic energy. As energy is withdrawn from a spinning flywheel, its angular speed decreases; as energy is supplied to a spinning flywheel, its angular speed increases. Conventionally used steel flywheels, while improving the performance of generators, are limited due to their weight and relatively low maximum permissible tip speeds.

Composite materials, such as graphite fiber reinforced epoxy, have specific strengths about ten times greater than steel. Thus, energy storage flywheels made of hoop wound composite materials can be spun at higher tip speeds to achieve higher specific energy storage than steel flywheels.

The selection of a composite material for a pulsed power flywheel must take into account the magnetic field in the vicinity of the rotor as its spins. The use of a nonconductive composite flywheel and shaft reduces eddy current losses which could be generated as the magnetic field ramps up and down during excitation and discharge. These losses not only produce a drag torque on the rotor, but can also heat and damage the composite material. "KEVLAR," polyaramid fiber made by the Dupont Corporation, graphite, boron, or glass fiber are best suited for flywheel and shaft construction, since they are relatively nonconductive.

When a nonconductive shaft and flywheel is used, it is also desirable to eliminate iron from the rotor of the generator completely and use an air-core magnetic circuit for exciting the rotor. This permits the flux density of the excitation field to be increased above the maximum level for iron core circuits, and when the increased flux density is coupled with the higher rotor speeds afforded by the composite flywheel, the generated voltage is substantially increased.

Composite materials, such as those mentioned above, exhibit phenomenal stiffness and strength in the axial direction of the fiber. These materials, however, are highly anisotropic. The transverse stiffness of a fiber composite can be thirty to forty times lower than the longitudinal stiffness, while the transverse strength can be two orders of magnitude lower than the longitudinal strength. Therefore, composite flywheels are typically constructed with the fibers wound predominantly in the circumferential direction (i.e., hoop wound). This construction results in less radial growth than a steel flywheel at any given speed. However, radial stress usually limits the flywheel's rotational speed due to the weak transverse strength of the composite material, and the severity of the problem usually increases with increasing flywheel thickness. Radial stresses produced by the rotation of the flywheel can cause the fibrous composite material to shred or crack circumferentially along the axis of the fibers.

To increase the maximum possible operating speeds of composite flywheels, they are usually constructed in an initial state of radial compression. As the flywheel's speed increases, the radial stress increases to zero, and then into the tensile region. Greater initial precompression leads to greater possible speeds, since the maximum tip speed is determined by the tip speed at which the radial stress exceeds the limit for the composite material.

Interference fits are commonly used to produce precompression. For example, two concentric annular sections of a flywheel have been assembled using an interference fit to produce radial compression in both sections. The interference fit is typically accomplished with tapered press fits rather than thermal fits, since fiber epoxy composites have coefficients of thermal expansion that are too low to provide a significant interface pressure. Interference fits produce a limited amount of precompression and satisfactory stress distribution. For tapered interference fits to be practical, however, the axial dimension of the annular sections must be relatively short to minimize axial assembly forces. Moreover, when a tapered interference fit is used, the assembly must be properly designed to guard against "growth mismatch" due to angular misalignment in the tapers. If not, the resulting uneven interface pressure could cause separation to occur at some portion of the interface, and such separation could lead to an unbalance which would damage the generator.

Fiber composite shafts present additional problems. A rotating shaft experiences radial, tangential, and bending stress. Therefore, more layers of fiber wound material are generally required to produce a shaft capable of performing well in the stressed condition. As stated previously, radial precompression produces flywheels having higher possible rotational speeds. Likewise, radial precompression produces shafts having higher terminal rotational speeds Unfortunately, an interference fit which produces radial precompression between two annular sections of a shaft is impractical due to the long axial dimension of the shaft.

SUMMARY OF THE INVENTION

The primary object of the present invention is to provide a fiber composite flywheel, shaft, or rotor having a selected amount of radial compressive prestress.

A specific object of the invention is to provide a fiber composite flywheel, shaft, or rotor having a radial compressive prestress that is a substantial fraction of the yield strength of the fiber composite material.

Another object of the present invention is to produce a flywheel which is capable of rotating at higher speeds than comparable conventional flywheels.

Yet another object of the present invention is to increase the energy storage and power generation capabilities of pulsed power electrical generators.

A further object of the present invention is to produce a fiber composite flywheel that requires little machining prior to use.

In accordance with the above-mentioned objects, a prestressed composite flywheel or shaft comprising at least an inner cylinder and an outer annulus is made by placing the cylinder within the annulus, injecting a bonding agent under pressure into the interface between the cylinder and the annulus, and maintaining the bonding agent under pressure while the bonding agent solidifies. The cylinder and the annulus are aligned in a concentric relationship during solidification by a chamber into which the cylinder and annulus are placed. Alternatively, the cylinder and the annulus for a rotor are aligned between alignment plates which are journaled to the shaft of the rotor and are mounted in a hydraulic press.

The rim portion of a large flywheel, for example, is formed from an outer ring (the above-mentioned annulus) and an inner ring (the above-mentioned cylinder, which is hollow in this case). The chamber in this case is defined by a pair of plates which abut opposite faces of the rings, and by two concentric cylinders which limit the radial movement of the outer and inner rings as the rings expand or contract, respectively, in response to the pressure of the bonding agent. The bonding agent is preferably epoxy resin and a catalyst mixed with chopped fiberglass rovings or other suitable reinforcing material such as silicon carbide whiskers and platlets or glass microspheres. The epoxy is cured by heat applied at a relatively low temperature while the rings are contained under stress within the chamber.

Such a prestressed flywheel or shaft according to the present invention has an outer annulus and an inner cylinder disposed in the outer annulus, and an annular layer of solidified bonding agent within an annular region between the outer annulus and the inner cylinder, wherein the outer annulus and the inner cylinder include substantial radial prestress induced by the bonding agent.

Large, thick flywheels preferably have multiple cylindrical sections joined by such layers of bonding agent, and a plurality of the cylindrical sections each including an outer layer of relatively stiff fiber-composite material, and an inner layer of relatively compliant fiber-composite material within an integral matrix material.

BRIEF DESCRIPTION OF THE DRAWINGS

Other objects and advantages of the invention will become apparent upon reading the following detailed description and upon reference to the drawings, in which.

Figure 1:
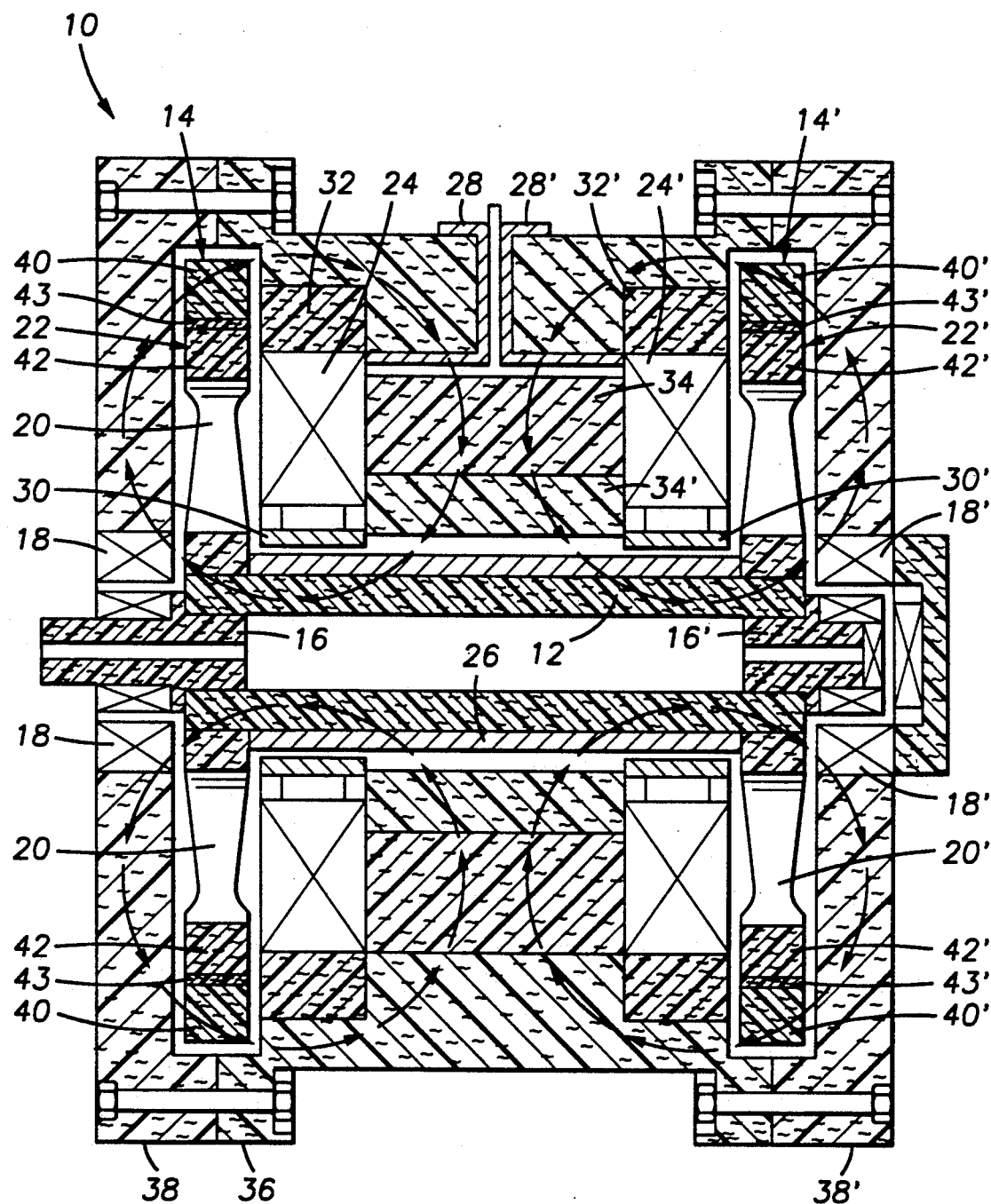
FIG. 1 is a sectional view of a homopolar generator having a fiber composite shaft and flywheel made in accordance with the invention.

While the invention is susceptible to various modifications and alternative forms, specific embodiments thereof have been shown by way of example in the drawings and will be described in detail herein. It should be understood, however, that it is not intended to limit the invention to the particular forms disclosed, but, on the contrary, the intention is to cover all modifications, equivalents, and alternatives falling within the spirit and scope of the invention as defined by the appended claims.

DESCRIPTION OF THE PREFERRED EMBODIMENTS

Turning now to FIG. 1 of the drawings, there is shown a homopolar generator 10 including a pair of fiber composite flywheels 14, 14' having been made in accordance with the present invention. The flywheels are interconnected by a fiber composite shaft 12 which is also made in accordance with the invention. The shaft 12 is generally hollow, although it may contain a foam core. The flywheels 14, 14' store rotational kinetic energy received from an external motor (not shown).

Each of the flywheels 14, 14' has an inner hub 16, 16' which spins within journal bearings 18, 18'. As the flywheels spin, the rotation (i.e., the "centrifugal force") produces stress in the radial direction from the hub 16, 16' through a central portion or web structure 20, 20' to the rim 22, 22', and tangential stress along the direction of rotation. The shaft 12 experiences a lesser amount of radial stress, but a greater amount of torsional stress at its ends and bending stress along its axis.

The homopolar generator 10 is designed to have a maximum energy density, in terms of the amount of energy stored per unit weight. The energy density, for example, exceeds 40 kilojoules per kilogram, and the total energy stored is 250 megajoules. This is possible using flywheels having a rim velocity of 1,000 meters per second in a generator which is 1.5 meters long and 1.2 meters in diameter.

The homopolar generator 10 also is designed to deliver a high level of power and a relatively high voltage, for example, 3 megaamperes at 500 volts. The voltage parameter in particular requires a self-excited air-core design in which the load-bearing components of the generator are capable of withstanding a high level of stress applied impulsively for a short duration of less than a second.

To obtain self-excitation of the generator, a pair of annular field coils 24, 24' are electrically connected in series with an armature 26 disposed on the shaft 16. The series circuit also includes output conductors 28, 28' and brushes 30, 30' which are engaged with the armature 26 to complete the circuit and deliver a current pulse to an external load (now shown). Just after engaging the brushes, an initial field current is supplied externally. This initial field current, however, is only a small fraction of the 3 megaampere field current that is provided by the generator itself.

The magnetic field generated by the field coils (shown by loops of arrows) has a radial component that intersects the mid-axial portion of the armature and thereby generates a voltage between the brushes when the brushes are engaged with the armature. The magnetic field also exerts forces on the field coils themselves as well as the output conductors 28 and the other conductors in the circuit. To withstand these forces, the field coils are contained by overwrap 32, 32' and are held together by axial repulsion tension bars 34, 34'. The field coil assembly itself is held within housing members 36 and 38, 38' that fix the journal bearings 18, 18' in spaced axial relation and provide containment of fragments in the event of flywheel failure.

Due to the high level of mechanical forces and the impulsive magnetic field in the generator, the structural components are preferably made of nonconductive fiber composite materials. Use of a nonconductive composite shaft 12 reduces weight and eddy current losses which would be generated as the magnetic field ramps up and down during excitation and discharge. Graphite-epoxy composites have the highest available specific strength and are preferred for this reason. Graphite-epoxy composites, however, have a slight conductivity and therefore must be used with caution in the shaft due to the possibility of excessive eddy current losses in this high-field region.

Due to the high flywheel rim velocity (1,000 meters per second) and the impulsive nature of the flywheel deceleration, the construction of the flywheel is of critical importance to achieving the maximum energy density and discharge speed for the homopolar generator. To provide increased strength in the tangential direction, the flywheel 14 is composed of circumferentially wound fibers such as "KEVLAR" polyaramid fiber or graphite. Fibers of this type exhibit extraordinary strength and stiffness in the axial direction of the fibers. Therefore, circumferentially wound fibers form a flywheel that is capable of withstanding a tremendous amount of tangential stress. The primary stresses imposed on the fibers are then oriented along their lengths and increase in proportion to the square of the radial distance of the fiber from the axis of rotation. Since the fibers are anisotropic, however, circumferentially wound flywheels have relatively low radial tensile strengths. In practice, it is the radial tensile stress in a fiber composite flywheel that limits the safe rotational operating speed. By establishing an initial radial compressive prestress, the maximum speed at which the flywheel may be operated safely is increased significantly since the radial stress caused by rotation must first relieve the compression before radial tensile stress arises.

In the flywheel 14, the radial compressive prestress is a maximum at the interface between an outer ring 40 and an inner ring 42. These rings are more clearly shown in the isometric view of FIG. 2. One method of providing the radial compressive prestress is to assemble the outer ring onto the inner ring by a press-fitting operating in which the inner and outer rings are dimensioned for a tapered interference fit. As noted above, however, rings assembled by such an interference fit are subject to possible separation, and such an interference fit is difficult to obtain between radially thin rings or shafts.

Figure 2:
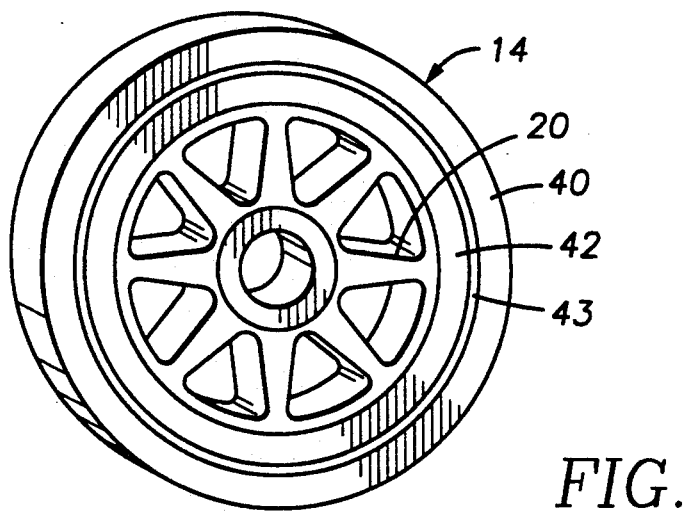
FIG. 2 is an isometric view of the flywheel.

In accordance with an important aspect of the present invention, a flywheel, shaft, rotor, or other article of manufacture, is assembled from radially thin concentric rings of fiber composite material by injecting a bonding agent under pressure into the interface between the rings and maintaining the pressure until the bonding agent solidifies. Therefore, it is possible to obtain a radial compressive stress in all of the rings and a tangential compressive stress in all but the outermost ring. Such an arrangement of prestress is preferred for achieving a maximum possible safe operating speed for the flywheel or shaft. During assembly of the flywheel 14 of FIGS. 1 and 2 from the outer ring and the inner ring 42, for example, bonding agent is injected under pressure into an annular region between the outer ring 40 and the inner ring 42, and the bonding agent solidifies under pressure while contained within the annular region to form an annular layer 43 coinciding with the annular region. In FIGS. 1 and 2, the thickness of the annular layer 43 has been exaggerated for illustration.

The annular layer 43 is continuous and has a uniform thickness everywhere, and it completely fills the annular region between the outer ring 40 and the inner ring 42.

Figure 3:
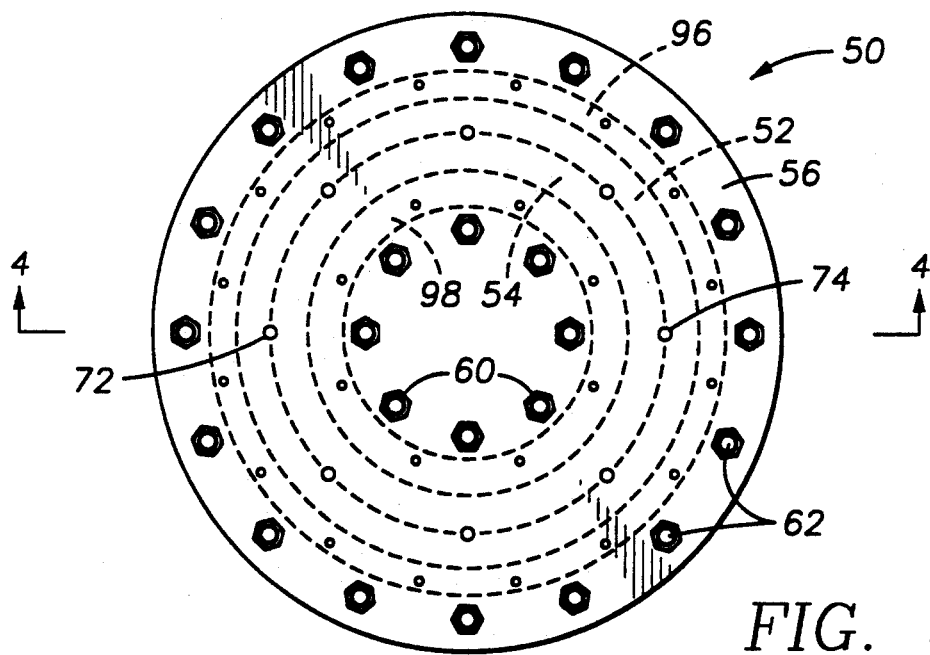
FIG. 3 is a front view of an apparatus for making a precompressed shaft or flywheel.
Figure 4:
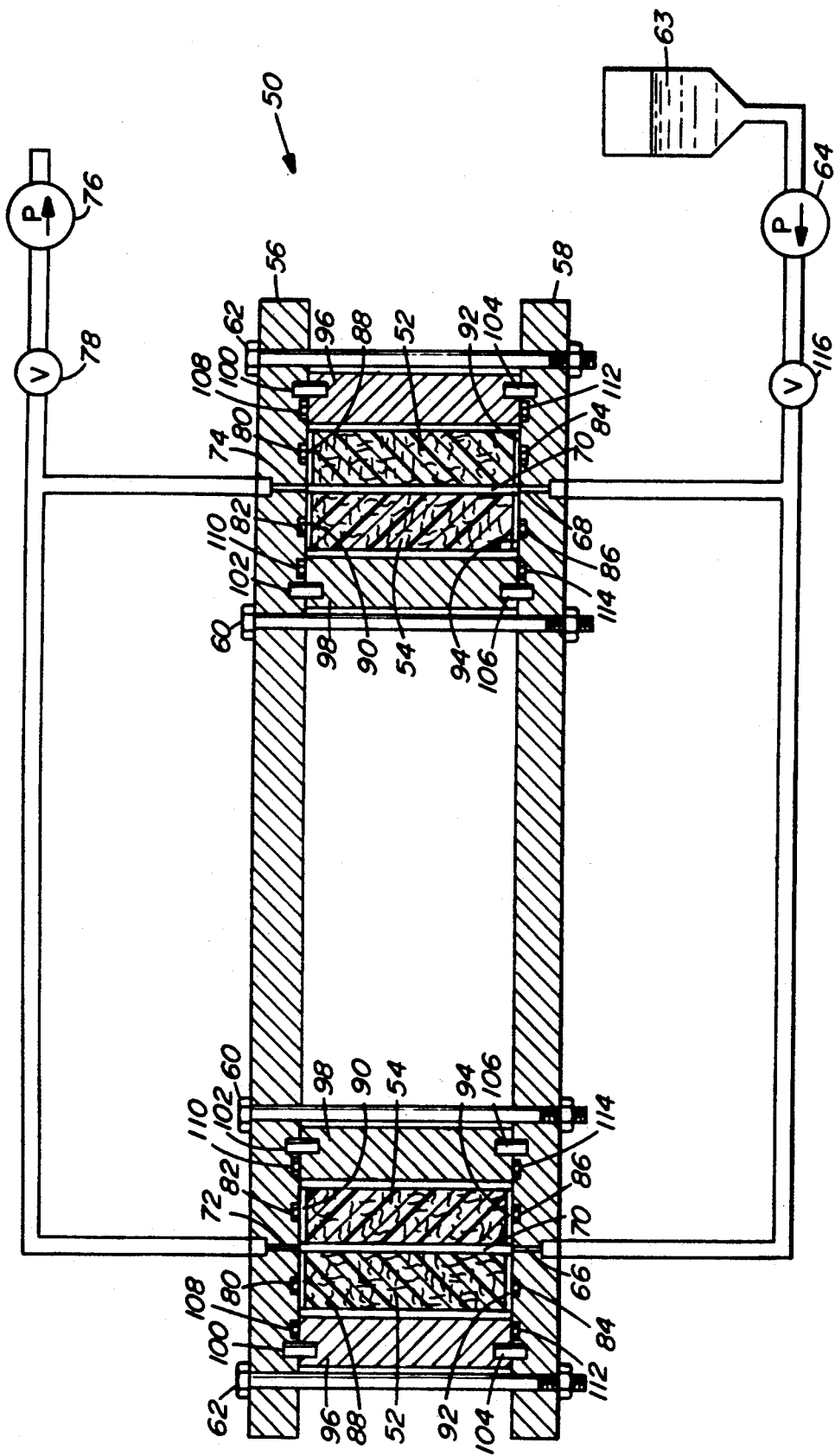
FIG. 4 a sectional view along line 4—4 in FIG. 3.

Turning now to FIGS. 3 and 4, there is shown an apparatus 50 especially adapted to assemble a pair of concentric rings 52, 54 for the rim of a flywheel of the present invention while maintaining the concentric or coaxial relationship between the rings. The fiber composite rings 52, 54 are disposed between two plates 56, 58. As shown in FIG. 4, the rings 52, 54 are clamped between the plates 56, 58 by an inner circle of bolts 60 and an outer circle of bolts 62.

A high pressure pump 64 injects a bonding agent 63, preferably an epoxy mixture reinforced with chopped fibers or other fillers, through openings 66, 68 in the lower plate 58 into a thin annular void 70 formed between the rings 52, 54. Air is removed from the annular region 70 via openings 72, 74 in the upper plate 56 to insure that the epoxy mixture fills the annular region 70. Although most of the air is displaced from the region 70 by the inrush of epoxy, a vacuum pump 76 advantageously extracts virtually all of the air via the openings 73, 74. When the air has been removed from the annular region 70, a valve 78 is closed to allow pressure to build between the rings 52, 54 when the epoxy is injected.

As the pressure of the epoxy mixture increases, the rings begin to move radially in response to the pressure. The diameter of the outer ring 52 expands, while the diameter of the inner ring 54 contracts. O-ring seals 80, 82, 84, 86 are disposed in respective grooves in the plates 56, 58 to provide a seal between the edges of each ring 52, 54 and the plates 56, 58. Since the edges of the rings 52, 54 that contact the O-rings and the plates exhibit frictional drag which tends to inhibit the radial movement of the rings, sacrificial rings 88, 90', 92, 94 of low-friction material such as "MYLAR" polyester film or "TEFLON" polytetrafluoroethylene are bonded to these faces of the rings. The sacrificial rings 88, 90, 94 provide a low friction surface for ease of movement of the fiber composite rings 52, 54.

To align the rings 52, 54 in a coaxial or concentric relationship when the epoxy mixture solidifies, two concentric steel cylinders 96, 98 are also supported between the plates 56, 58 such that the fiber composite rings 52, 54 fit in the chamber formed by the cylinders 96, 98 and the plates 56, 58. As the fiber composite rings 52, 54 move radially, the outer ring 52 contacts the outer cylinder 96, and the inner ring 54 contacts the inner cylinder 98. Preferably, the cylinders 96, 98 are held in place by circles of pins 100, 102, 104, 106 between the cylinders 96, 98 and the plates 56, 58. O-ring seals 108, 110, 112, 114 could also be placed between the cylinders 96, 98 and the plates 56, 58 to prevent any leakage of epoxy from contacting the pins.

The cylinders 96, 98 limit the radial movement of each ring 52, 54 to respective predetermined radial positions. By maintaining concentricity of the rings 52, 54, the epoxy-filled annulus 70 is of uniform thickness in the radial and axial directions. Therefore, a minimum of machining after assembly of the flywheel is required to ensure dynamic balance.

When the pressure of the epoxy mixture reaches a predetermined pressure, a valve 116 is closed to keep the uncured epoxy mixture under pressure. The epoxy is then cured under pressure while the rings 52, 54 remain in the apparatus 50. To minimize thermal growth of the rings 52, 54 during curing, the curing preferably is performed at a relatively low temperature such as 125 degrees Fahrenheit. After the epoxy mixture cures, the bonded rings 52, 54 are extracted from between the plates 56, 58 and the sacrificial rings 88, 90, 92, 94 are removed. The bonded rings 52, 54 are then used as the rim of a flywheel where both rings have a radial compressive prestress, the innermost ring 54 has tangential compressive prestress, and the outermost ring 52 has a tangential tensile stress.

The apparatus 50 may be modified to simultaneously induce compressive stresses on more than two rings. For the case of three concentric fiber composite rings, for example, the apparatus requires openings for epoxy injection and air removal for each of the two annular regions between the pairs of adjacent rings. To further obtain a desired stress distribution, separate respective pumps could be used for injecting the bonding agent at a different selected pressure in each of the annular regions.

By way of example, two circumferentially wound "KEVLAR" polyaramid fiber rings were machined such that the outer ring had an inner diameter of 21.52 inches, an outer diameter of 23.00 inches, and a width of 3.00 inches, and the inner ring had an inner diameter of 20.0 inches, outer diameter of 21.48 inches, and a width of 3.00 inches. The ring faces were coated with a layer of epoxy which was cured against a glass plate to provide a smooth surface. When concentrically supported between a pair of aluminum plates, the rings formed an annular region between them having a width of 0.02 inches.

To permit strain gages to be attached to the outer circumference of the outer ring and the inner circumference of the inner ring, circles of pins fixed to the plates instead of steel cylinders were used as a means for aligning the rings in a concentric relationship. The outer diameter of the inner circle of pins measured 19.96 inches, and the inner diameter of the outer circle of pins measured 23.03 inches. Therefore, the inner diameter of the inner composite ring could decrease by 0.04 inches to 19.96 inches, and the outer diameter of the outer composite ring could increase by 0.03 inches to 23.03 inches, without being limited by the circles of pins.

A grease gun rated at 10,000 psi injected a fiber-reinforced epoxy mixture (Epon Corp. type 828 and V-40 epoxies) through an opening in the lower one of the plates into the annulus between the two fiber composite rings. Silicon rubber O-ring seals between the surface of the plates and the glass-cured epoxy edges of the rings helped prevent epoxy leakage. After the epoxy filled the annulus, an air bleed hole in the upper plate was plugged. The grease gun then injected the epoxy mixture to a final pressure of 1250 psi. The clamping bolts between the plates were tightened to permit the seals to withstand the increased pressure. This pressure was sufficient to move the inner and outer composite rings into engagement with the inner and outer circles of pins, respectively. A 5000 psi check valve maintained the pressure while the pressurized epoxy was cured at about 125 degrees Fahrenheit.

After the epoxy had cured, the bonded rings were removed from the apparatus, and the rings were found to have retained a substantial portion of the stress induced by the injection of the uncured epoxy. The inner ring retained about 86% of its maximum stress during epoxy injection, and the outer ring retained about 60% of its maximum stress during epoxy injection. The retained stress included a radial compressive stress in both rings, a tangential compressive stress in the inner ring, and a tangential tensile stress in the outer ring.

Construction of a composite shaft (such as the shaft 12 in FIG. 1) follows generally the same procedure using a very similar apparatus. Different design considerations, however, reflect the different operating environment experienced by the shaft 12. The shaft 12 experiences radial stress, torsional stress, and bending stress. Therefore, to provide strength in various directions, fiber composite shafts are typically constructed of a plurality of annular layers of fiber oriented at different angled with respect to the axial dimension of the shaft. For instance, one layer contains axially oriented fibers to provide bending stiffness, while the next layer contains fibers oriented at 45° with respect to the shaft's axis to provide torsional strength. A shaft of this type, however, possesses very low circumferential and radial strength.

Figure 5:
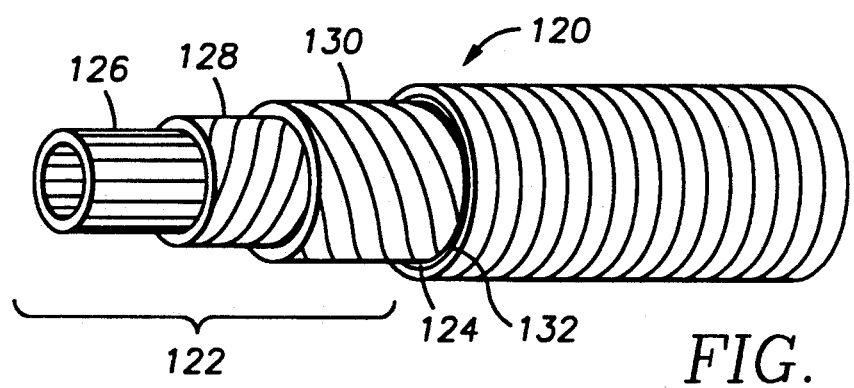
FIG. 5 is a schematic diagram of a composite shaft having a hoop wound outer layer assembled onto an inner layer having axial and skewed fibers in accordance with the present invention.

The internal construction of an improved fiber composite shaft 120 is shown in FIG. 5. To impart circumferential and radial strength to the shaft, a cylindrical or tubular inner layer 122 composed of fibers oriented axially and at 45° to the shaft's axis is bonded to a tubular outer layer 124 of circumferentially wound fibers using the pressurized epoxy cure method. For the sake of illustration, the inner layer 122 is shown having inner axial fibers 126 and layers 128, 130 having fibers at alternate 45° angles, but it should be appreciated that the inner layer 22 can have a multiplicity of alternate internal layers and be fabricated by conventional techniques, such as poltrusion.

In accordance with an important aspect of the invention, the layers 122, 124 are bonded together by injecting a bonding agent between the layers 122 and 124 to form a continuous annular layer 132 of the bonding agent and to produce a radial precompression in both layers. The thickness of the layer 32 has been exaggerated in FIG. 5 for the sake of illustration. In this example, the outer layer is initially formed as a tube or elongated annulus, and the inner layer 122 (including sublayers 126, 128, and 130, and possibly other similar sublayers) is formed as a tube or elongated hollow cylinder. To receive these tubes having the axial length of the desired shaft, the apparatus of FIG. 3 need only be provided with cylinders (similar to cylinders 96, 98 in FIG. 4) having a correspondingly longer length.

Flywheels of the present invention can be made that are relatively thick or long in the axial direction. Moreover, such thick and long flywheels may include a multiplicity of hoop-wound fiber-composite cylinders, and have a degree of radial compressive prestress that is a substantial fraction of the yield limits of the fiber-composite material. Design considerations for a thick multi-section flywheel will now be discussed with reference to the thick single-section flywheel 200 of FIG. 6A and the thick multi-section flywheel of FIG. 6B.

As noted above, filament wound composites are extremely strong in tension in the fiber direction, but they are very weak in the directions transverse to the fiber. In the case of a high speed flywheel, the composite is wound with the fibers in the hoop direction so that the fiber strength can resist the large hoop stresses encountered during rotation at high speed. The directions transverse to the fiber are the rotor radial and axial directions.

Tensile radial stresses due to spin can be high in the thick-walled single-section flywheel 200 and can easily exceed the transverse strength of the composite materials. In contrast, the multiple-section flywheel 210 is constructed of a series of concentric cylinders 211, 212, 213, 214, 215 such that each cylinder interface is provided with a radial precompression that offsets the radial tension build-up at high speed. The radial precompression is selected so that the maximum stress within each cylinder and at each cylinder interface remains compressive at the maximum rotor speed, resulting in a composite flywheel design that overcomes the transverse weakness of the composite material.

Figure 6B:
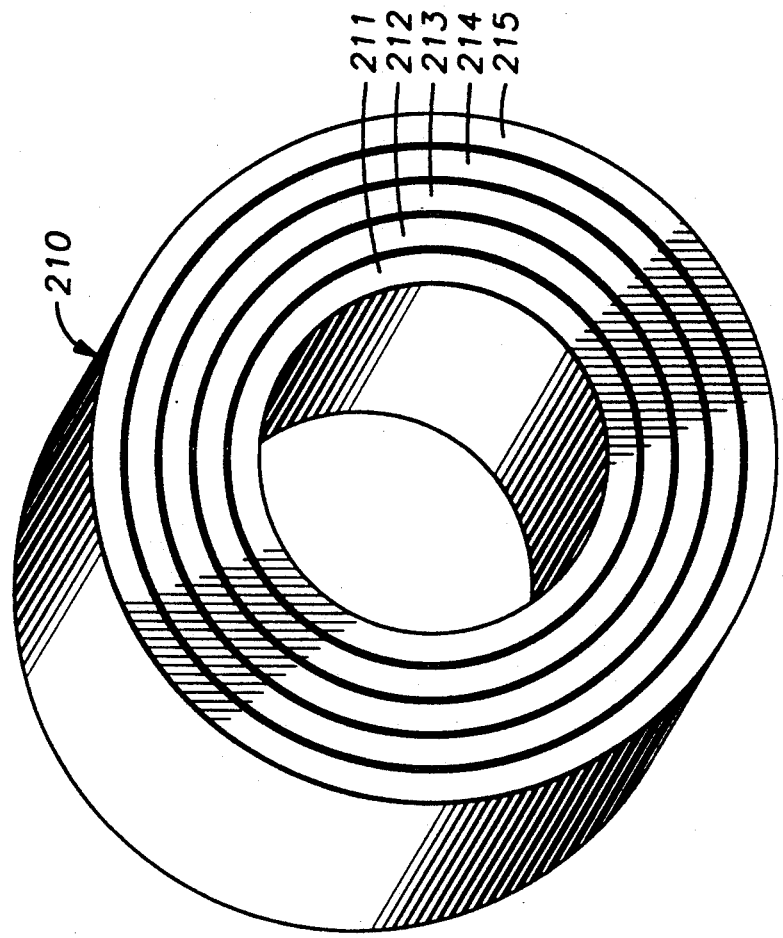
FIG. 6B is a pictorial view of a multiple-section composite flywheel.
Figure 6A:
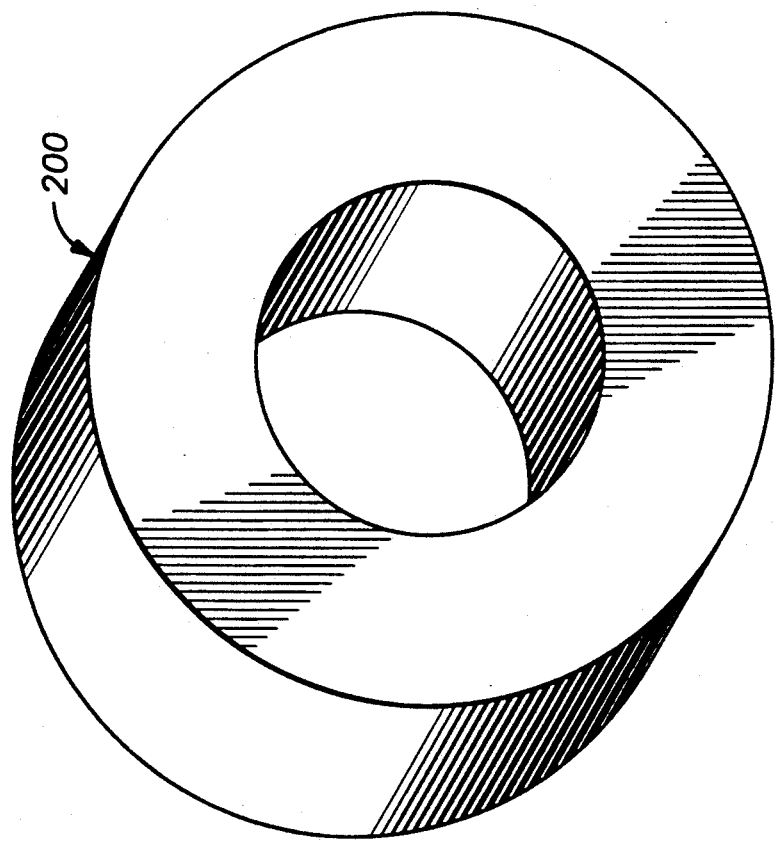
FIG. 6A is a pictorial view of a single-section composite flywheel and a multiple-section composite flywheel.
Figure 7:
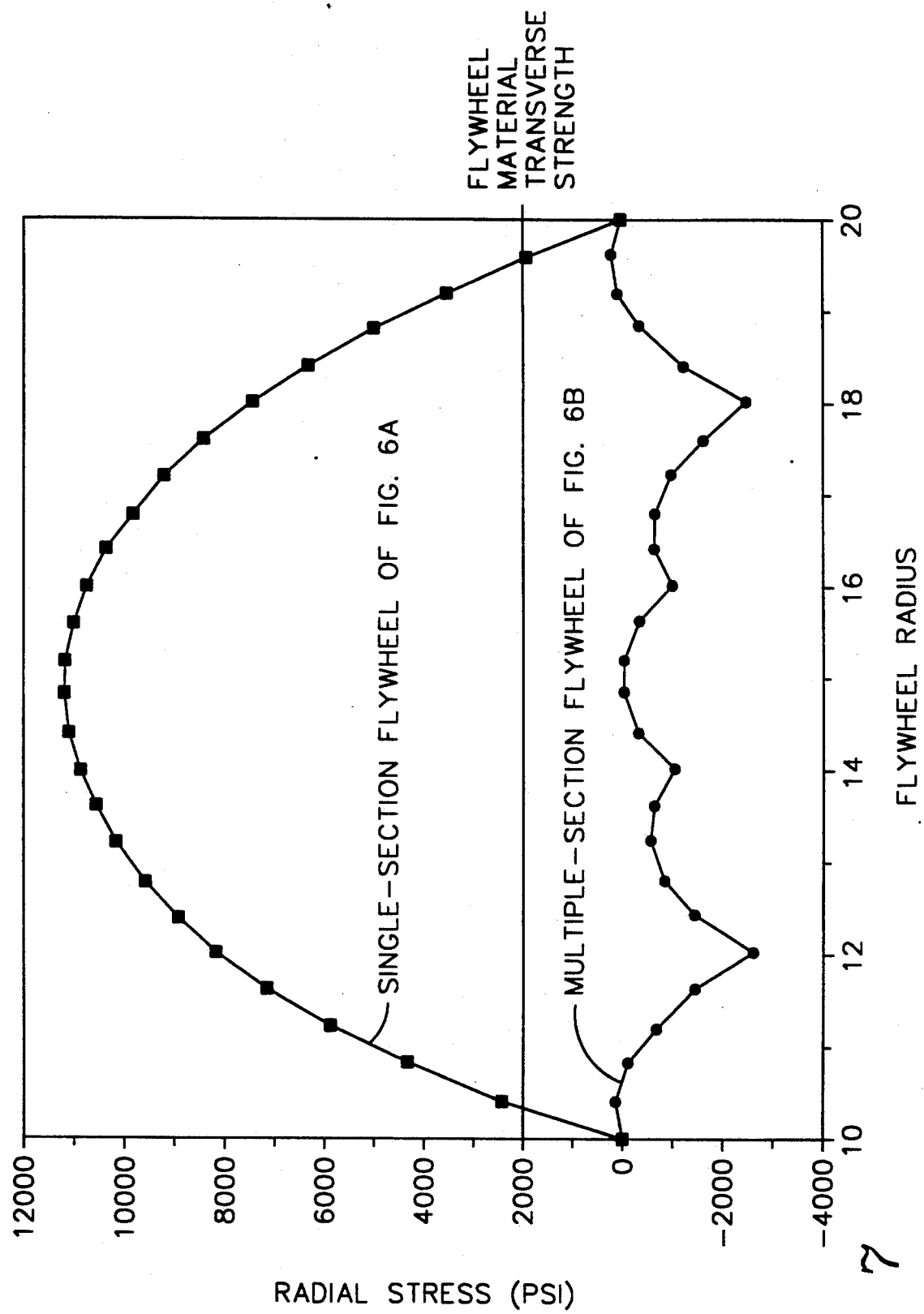
FIG. 7 shows superimposed graphs of the radial (transverse) stress distributions in the fiber composite flywheel of FIGS. 6A and 6B operating at 1000 meter/sec. tip speed.

FIG. 7, for example, shows a graph of the radial stress distribution in the thick-walled single-section flywheel 200 of FIG. 6A superimposed upon a graph of the radial stress distribution of the thick-walled flywheel 210 of FIG. 6B. The flywheels 200, 210 are assumed to be constructed of hoop-wound graphite fiber (type IM6 by Hercules) in an epoxy matrix. Type IM6 graphite fiber has a 0.197 mill diameter and a 94% carbon content to provide a tensile strength of 740 ksi and a modulus of 40 msi. In all cases described below, the epoxy matrix is Shell "EPON" (trademark) epoxy resin. The flywheels 200, 210 are also assumed to be rotating with a tip speed of 1000 m/s (approximately 10,000 rpm for a flywheel having an outer diameter of 40 inches). The peak radial tensile stress for the single-section flywheel 200 is over 11,000 psi, more than five times its transverse strength. In the case of the multiple-section flywheel 210, progressive radial precompression at each ring interface has limited the peak radial tension to a negligible amount.

Figure 8:
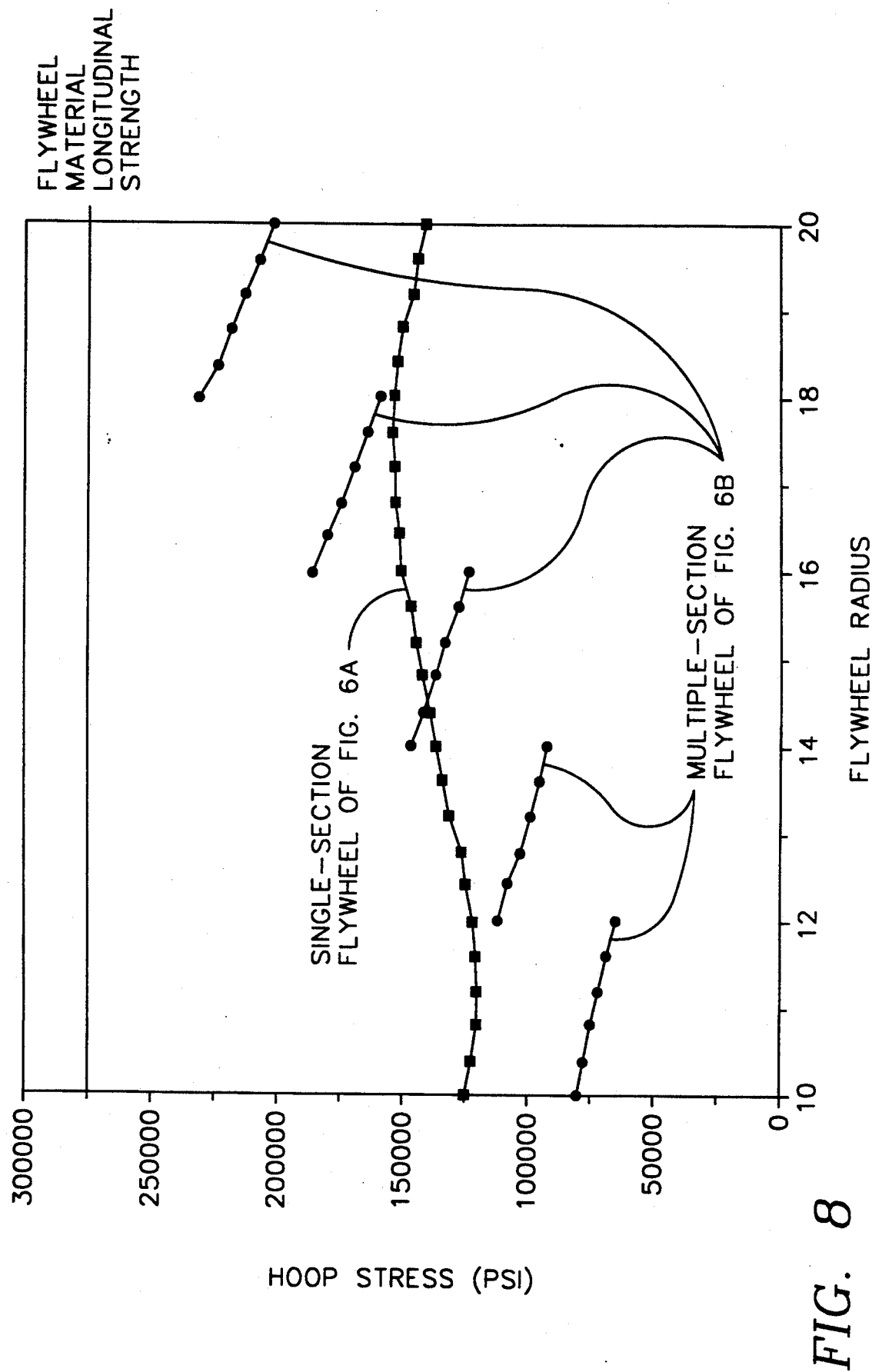
FIG. 8 shows superimposed graphs of the hoop stress distributions for the single-section flywheel of FIG. 6A and the multiple-section flywheel of FIG. 6B.

FIG. 8 shows the hoop stresses developed in the flywheels 200, 210 of FIGS. 6A and 6B. The hoop stress for the single-section flywheel 200 is continuous and fairly constant at a low level compared to the fiber direction strength of the fiber-composite material. The rotation speed of the single-section flywheel 200, therefore, is limited by the radial (transverse) strength of the fiber-composite material, while a large margin exists between the developed hoop stress and the material fiber direction strength. The hoop stress in the cylinders making up the multiple-section flywheel is discontinuous due to the concentration of radial precompression at each cylinder interface, and shows a wider variation with the maximum hoop stress in the outer cylinder 215 approaching the material strength. Thus, radial precompression at each cylinder interface in the multiple-section flywheel 210 uses excess tensile hoop strain capability to prevent the build-up of radial tension, resulting in higher possible rotation speeds.

Figure 9:
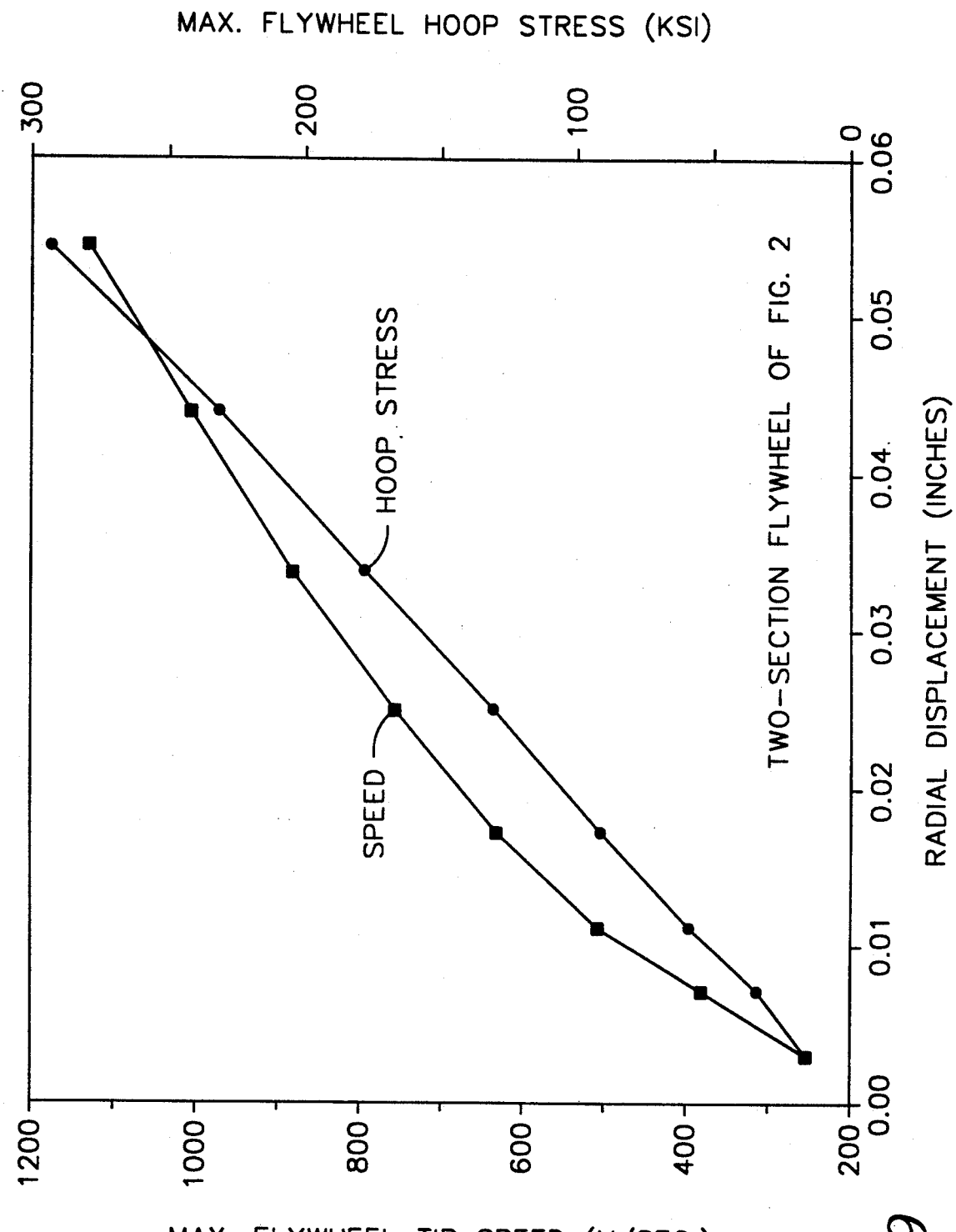
FIG. 9 shows a graph of the maximum allowable operating speed as a function of radial displacement induced by the manufacturing process for a two-ring flywheel similar to the flywheel shown in FIG. 2.

FIG. 9 shows the maximum possible rotation speed of a two-section flywheel constructed with two rings similar to the flywheel 14 in FIG. 2, as a function of the radial displacement between the two flywheel rings from an unstressed configuration. In a two-piece flywheel constructed by the previous tapered press-fit method, this radial displacement is the interference between the unstressed rings. In the flywheel (14 of FIG. 2) made in accordance with the invention, this radial displacement is the relative expansion or increase in the gap between the rings induced during the injection of bonding agent under pressure. The criterion for the speed limit for a given radial displacement is the highest speed at which the computed radial stress at the interface of the two rings remained compressive. In this case the highest speed is computed from specified dimensions and material properties of the flywheel. It is assumed that the inner ring of the two-ring flywheel has an inner radius of 10 inches and an outer radius of 15 inches, and the outer ring of the two-ring flywheel has an inner radius of 10 inches and an outer radius of 20 inches. Moreover, it is assumed that the two-ring flywheel is made of hoop-wound IM6 graphite-fiber epoxy composite material, having a hoop tensile strength of 275 ksi, a tensile modulus of 29 msi, and a density of 0.0060 lb/in$^3$. Also shown in FIG. 3 is the maximum hoop stress developed in the rotating flywheel as a function of the radial displacement. Thus, with the use of radial precompression, a radially thick flywheel can be constructed whose maximum rotational speed is limited by the composite's fiber direction strength, rather than the much weaker transverse strength.

Another closely related us of composites in rotors is as support bandings for weak underlying structures. Due to the excellent specific stiffness and strength characteristics of fiber-reinforced composites in the fiber direction, a weak structure such as an armature winding can be supported at high speeds with a composite banding. Here, precompression of the armature both radially and circumferentially by the banding, allows higher rotational speeds by offsetting tensile radial and hoop stress build-up in the armature.

The present invention offers significant advantages over precompression by conventional interference fit. Conventional thermal fits used for shrinking metallic rings together are not practical for composite rings due to the low thermal expansion coefficients in the fiber direction of most composites in conjunction with low temperature handling capabilities of most epoxy systems. Light press fits, in which one ring is forced over another with an axial load, are easily accomplished. A variation of this procedure is the tapered press fit, in which the parts are tapered so that the interference is built up over a much reduced engagement length, resulting in a much reduced press height and stroke requirements. Tapered press fits are not practical, however, for large flywheels composed of long cylindrical sections, since it is difficult to manufacture long tapered winding mandrels to close tolerances.

For heavy interference fits, several problems arise when composite parts are press-fit together. Care must be taken not to exceed the transverse compressive strength of the material of the cylindrical section being pressed on, as well as its transverse shear strength. Furthermore, composites are prone to failure in cases of combined loading, for instance, when transverse tension or compression coexists with transverse shear. The presence of the shear component results in a decreasing capability of the composite to handle the transverse component of stress, resulting in a matrix mode failure if the stresses are high enough. Another situation is when fiber direction tension coexists with interlaminar shear, resulting in a fiber mode failure.

The amount of force required by either a conventional press fit or a tapered press fit is proportional to the friction coefficient, the interference pressure between the cylindrical sections, and the total surface area of the interface. Therefore, long shaft or flywheel sections can require very high axial loads to accomplish the press fit operation. During the press fit, large axial compressive stresses are therefore experienced in the cylindrical section and also result in large interlaminar shear stresses. Failure can therefore be induced during the press fit, even though the hoop strength of the cylindrical section has not been exceeded. This becomes a fundamental limitation for the amount of interference which can be obtained using tapered press fits.

During a conventional press fit operation, the end of an outer cylindrical section being assembled is expanded over the end of an inner cylindrical section. This creates a region in the outer cylinder that experiences both transverse bending and shear stresses. If the interference is large enough, the tensile bending stress in combination with the transverse shear stress will produce tensile matrix mode failure. Thus, the inherent weakness of composites in shear, as well as in the transverse direction, requires that tooling in the form of a lead-in plug be used to reduce the magnitude of shear and transverse bending stresses in the outer cylindrical section being pressed on as it is deflected outward by the interference. The lead-in plug reduces combined stresses during assembly by providing a more gradual transition to the deflected position. The length of the lead-in plug controls the amount of shear and bending stress and so, in general, larger interferences require longer lead-in plugs. However, a longer lead-in plug also increases the axial load required to overcome the friction between the ring and the lead-in plug, and again will lower the amount of interference obtainable.

In contrast, the present invention provides an apparent interface pressure at the ring contact surfaces that is uniform along the contact length (unlike conventional interference fits, which can result in variation of the interface pressure, depending on the compliance of the underlying structure). No lead-in plugs are required during assembly. No bending or shear stresses are induced during assembly, and axial loads on the ring are low compared to press fitting. Because the flywheels and shafts of the present invention do not have bending or shear stresses induced in the outer cylindrical section during assembly, larger amounts of interface pressure can be produced without danger of failing the ring. The resultant layer of bonding agent between the rings remains in hydrostatic compression after curing.

Because stresses in the outer cylinders are greatly reduced during assembly, the finished product of the present invention may have a degree of radial precompression that is closer to the yield limit of the material for any given safety factor.

The finished product of the present invention has a uniform stress distribution, with no axial or shear stresses. In the case of an outer ring assembled with a conventional press fit, variations in the compliance of the underlying structure (produced by armature windings, for instance) would cause the ring to deflect nonuniformly, resulting in axial and/or hoop bending stresses and shear stresses. Thus, for an assembly involving installing an outer ring onto a rotor subassembly having a variation in its radial compliance along its axis or its circumference, the product of the present invention can safely have higher radial precompression than is possible with a conventional press fit, resulting in higher rotational speed.

Because the products of the present invention can be assembled with an initial clearance between neighboring cylindrical sections, the neighboring surfaces are undamaged. This advantage could be especially advantageous when an inner cylinder is a ceramic or other material in which surface damage could propagate as cracks and cause structural failure.

In some products having long thin cylindrical sections (such as support bandings) with a high degree of radial precompression, assembly by the tapered press-fit method would not be possible, since axial press loads required to overcome friction would exceed the transverse compressive strength of the material. These products can only be made in accordance with the present invention, because the products of the present invention can be assembled without any axial loads to overcome friction.

In some products where the radial compliance of the underlying structure varies circumferentially, bending and shear stresses would be induced in a ring being assembled with a press fit, resulting in failure of the ring. These products can only be made in accordance with the present invention, because the products of the present invention can be made with a degree of radial precompression that is uniform in the circumferential direction. In the present invention, the precompression is induced hydrostatically and maintained during curing of the bonding agent.

Figure 12:
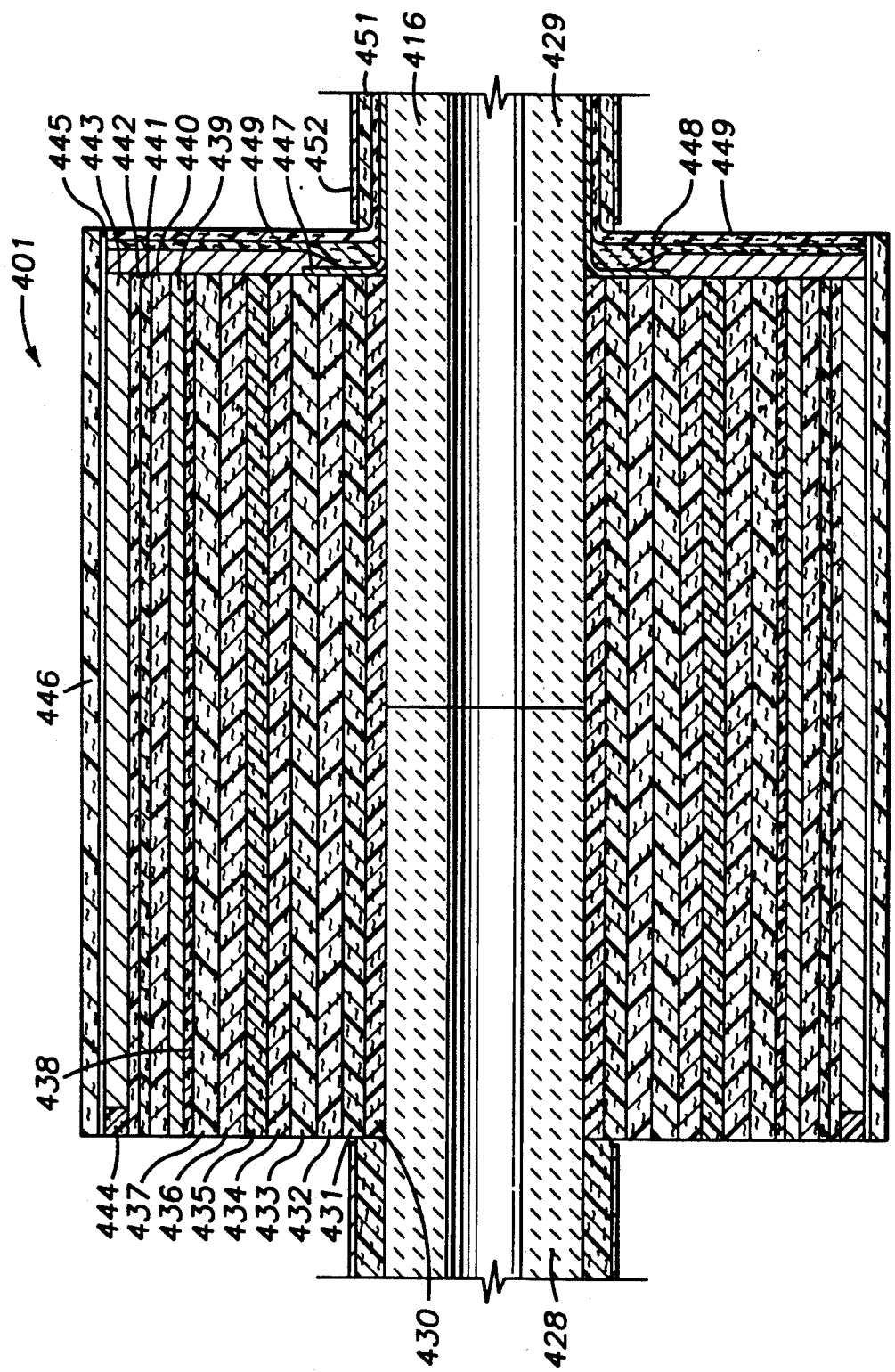
FIG. 12 shows a cross-sectional view of the small fiber-composite compulsator rotor introduced in FIG. 11.

Two composite flywheel/rotor pulsed alternators incorporating the present invention are currently being manufactured. Each of the rotors is made up of ten to fifteen concentric composite cylinders which are assembled with radial precompression to allow operation at high speed. Both rotors incorporate armature windings near the outer diameter, and require a high strength graphite composite banding which must be installed to place a very high degree of radial precompression upon the armature and maintain compression at high speed. The smaller rotor, further described below with respect to FIG. 12, is 15.6 inches in diameter and 18 inches long. Tapered press fits were used for the majority of its assembly. An attempt to install an outer graphite-composite banding was made using the tapered press fit method but the graphite-composite banding failed before the assembly was complete. It was expected that the tapered press fit would be successful in achieving an initial radial precompression of about 40% of the yield strength of the graphite-composite bonding. Further analysis, however, showed that stresses developed during assembly caused the failure. The banding (446 in FIG. 12) was then assembled, in accordance with the present invention, with the full degree of radial precompression without any failure of the composite material.

The purpose of the banding (446 in FIG. 12) was to precompress the rotor radially in order to offset radial tensile stresses due to rotation and to limit radial and hoop growth of an underlying armature winding. The banding and interference were sized so that the interference pressure was 3500 psi and the banding hoop stress was 126,000 psi. The banding was to be assembled using a tapered press fit in which 15,000 psi of compressive axial load was required to overcome friction at the interface. The graphite material strengths are believed to be 275,000 psi in fiber tension and 20,000 psi in transverse compression, thus a successful assembly was expected. During the assembly process, the banding fractured, resulting in abortion of the assembly attempt.

Failure analysis was conducted in order to determine the cause of the banding failure. Failure criteria described in Hashin Z., "Failure Criteria for Unidirectional Fiber Composites," *Journal of Applied Mechanics*, Vol. 47, 1980, p. 329, were used to determine the probability of failure due to the compressive axial stress and the tensile hoop stress. Hashin's criteria are three-dimensional failure criteria for unidirectional fiber composites established in terms of quadratic stress polynomials which are expressed in terms of the transversely isotropic invariants of the applied average stress state. Four failure modes—tensile and compressive fiber and matrix modes—are modeled separately, resulting in a piecewise smooth failure surface. The four failure modes, tensile fiber mode (TFM), compressive fiber mode (CFM), tensile matrix mode (TMM) and compressive matrix mode (CMM) are given below in terms of hoop, axial and radial stresses, transverse and interlaminar shear stresses and the material strengths.

TFM  applicable if $\sigma_{11} > 0$       $\sigma_{11}$ = hoop stress
$(\sigma_{11}/S_F^+)^2 + \{(\sigma_{12})^2 + (\sigma_{13})^2\}/(T_I)^2 = 1$ CFM  applicable if $\sigma_{11} < 0$
$\sigma_{11} - S_F^- = 1$ TMM  applicable if $\sigma_{22} + \sigma_{23} > 0$   $\sigma_{22}$ = radial stress
                                          $\sigma_{33}$ = axial stress
$(\sigma_{22} + \sigma_{33})^2/(S_T^+)^2 + \{(\sigma_{23})^2 - \sigma_{22}\sigma_{33}\}/(T_T)^2 + \{(\sigma_{12})^2 + (\sigma_{13})^2\}/(T_I)^2 = 1$
$\sigma_{12}$ & $\sigma_{13}$ & $\sigma_{23}$ = shear stresses CMM  applicable if $\sigma_{22} + \sigma_{33} < 0$
$\{(S_T^-/T_T)^2 - 1\}(\sigma_{22} + \sigma_{33})/S_T^- + (\sigma_{22} + \sigma_{33})^2/(4T_T)^2 + \{(\sigma_{23})^2 - \sigma_{22}\sigma_{33}\}/(T_T)^2 + \{(\sigma_{12})^2 + (\sigma_{13})^2\}/(T_I)^2 = 1$ where the 1, 2 and 3 indices refer to the rotor hoop, radial and axial directions, respectively, and:

$S_F^+$ is the fiber direction tensile strength, approximately 275,000 psi for graphite $S_F^-$ is the fiber direction compressive strength, approximately 100,000 psi $S_T^+$ is the transverse direction tensile strength, approximately 2200 psi $S_T^-$ is the transverse direction compressive strength, approximately 20,000 psi $T_T$ is the transverse shear strength, approximately 6,000 psi $T_I$ is the interlaminar shear strength, approximately 7,000 psi Failure is indicated for a particular mode if stress values entered into the appropriate Hashin failure criterion results in a calculated number equal to or greater than one. In the case of the failed banding only TFM and CMM apply.

The following cases were examined:

Case 1. Stress tensor at the bore of the banding during axial loading of the banding:

| | |
|---|---|
| Radial stress: | −5150 psi |
| Axial stress: | −10,000 psi |
| Transverse shear stress: | 0 psi |
| Interlaminar shear stress: | 0 psi |
| Hoop stress: | 126,000 psi |
| Hashin CMM number: | −1.18 (No failure predicted) |
| Hashin TFM number: | .21 (No failure predicted) |

Case 2. Stress tensor at the outer surface of the banding during axial loading of the banding:

| | |
|---|---|
| Radial stress: | 0 psi |
| Axial stress: | −10,000 psi |
| Transverse shear stress: | 0 psi |
| Interlaminar shear stress: | 0 psi |
| Hoop stress: | 126,000 psi |
| Hashin CMM number: | −.19 (No failure predicted) |
| Hashin TFM number: | .21 (No failure |

Cases 1 and 2 depict the expected stress levels during the assembly.

After the failure occurred, a planar finite element analysis was done to determine the effect of differences in radial stiffness in the armature winding layer underneath the banding. Variation in radial stiffness can be caused by spacer material within the armature with a different radial stiffness than the armature winding, or by the presence of voids due to improper impregnation of the windings with epoxy. It was found that in this particular case, a difference in radial stiffness of 15% results in conditions producing TFM failure in the banding:

Case 3. Stress tensor in the banding at the point of highest axial shear stress due to radial stiffness variation of 15% in the underlying armature winding layer:

| | |
|---|---|
| Radial stress: | 0 psi |
| Axial stress: | −10,000 psi |
| Transverse shear stress: | 0 psi |
| Interlaminar shear stress: | −6962 psi |
| Hoop stress: | 108,000 psi |
| Hashin CMM number: | −.19 (No failure predicted) |
| Hashin TFM number: | 1.14 (Failure predicted) |

A rotor having an armature banding made in accordance with the present invention results in a uniform banding deformation that is not dependent on characteristics of the underlying structure, resulting in the following case:

Case 4. Stress tensor in the banding during injection and curing of bonding agent under pressure:

| | |
|---|---|
| Radial stress: | −5150 psi |
| Axial stress: | 0 psi |
| Transverse shear stress: | 0 psi |
| Interlaminar shear stress: | 0 psi |
| Hoop stress: | 126,000 psi |
| Hashin CMM number: | −.27 (No failure predicted) |
| Hashin TFM number: | .21 (No failure predicted) |

The small caliber rotor banding was eventually successfully assembled onto the rotor in accordance with the present invention.

In order to attain higher tip speeds, more initial radial displacement of the banding would be needed for a higher degree of radial prestress. If, for example, twice as much interference were needed for the small caliber rotor banding, then the interference pressure would be doubled as would the axial load required to press the banding on in the case of a tapered press fit operation. This would result in the following situation at the outer diameter of the banding during the pressing operation:

| | |
|---|---|
| Radial stress: | 0 psi |
| Axial stress: | −20,000 psi |
| Transverse shear stress: | 0 psi |
| Interlaminar shear stress: | 0 psi |
| Hoop stress: | 252,000 psi |
| Hashin CMM number: | −1.00 (Failure predicted) |
| Hashin TFM number: | .84 (No failure predicted) |

Thus, even though the graphite banding's hoop strength was sufficient to allow the increase in banding interference, a press-fit assembly method would result in an axial stress during pressing that exceeds the transverse compressive strength of the material. Thus, the tip speed of the rotor would be limited not by the stresses encountered in the rotor during operation, but stresses encountered during assembly. With the present invention, the stresses during assembly are not significantly greater than the stresses encountered in the fully assembled condition, because, after curing, the bonding agent retains most all of the stress induced during the injection and curing of the bonding agent under pressure:

| | |
|---|---|
| Radial stress: | −10300 psi |
| Axial stress: | 0 psi |
| Transverse shear stress: | 0 psi |
| Interlaminar shear stress: | 0 psi |
| Hoop stress: | 252,000 psi |
| Hashin CMM number: | −.18 (No failure predicted) |
| Hashin TFM number: | .84 (No failure predicted) |

The second, larger rotor is further described below with respect to FIGS. 13 to 15. Assembly of this larger rotor is now about 80% complete. This second rotor will be 43.6 inches in diameter and 83.2 inches long when fully assembled. For large flywheels of this nature, millions of pounds of press force would be required for assembly by the tapered press-fit method. The main armature banding, for instance, would require about 3 million pounds to install as a press fit. This would not only fail the main armature banding in axial compression, but would also be impractical due to the unavailability of a press large enough to do the job. Therefore, such a large flywheel can only be made in accordance with the present invention.

Figure 10:
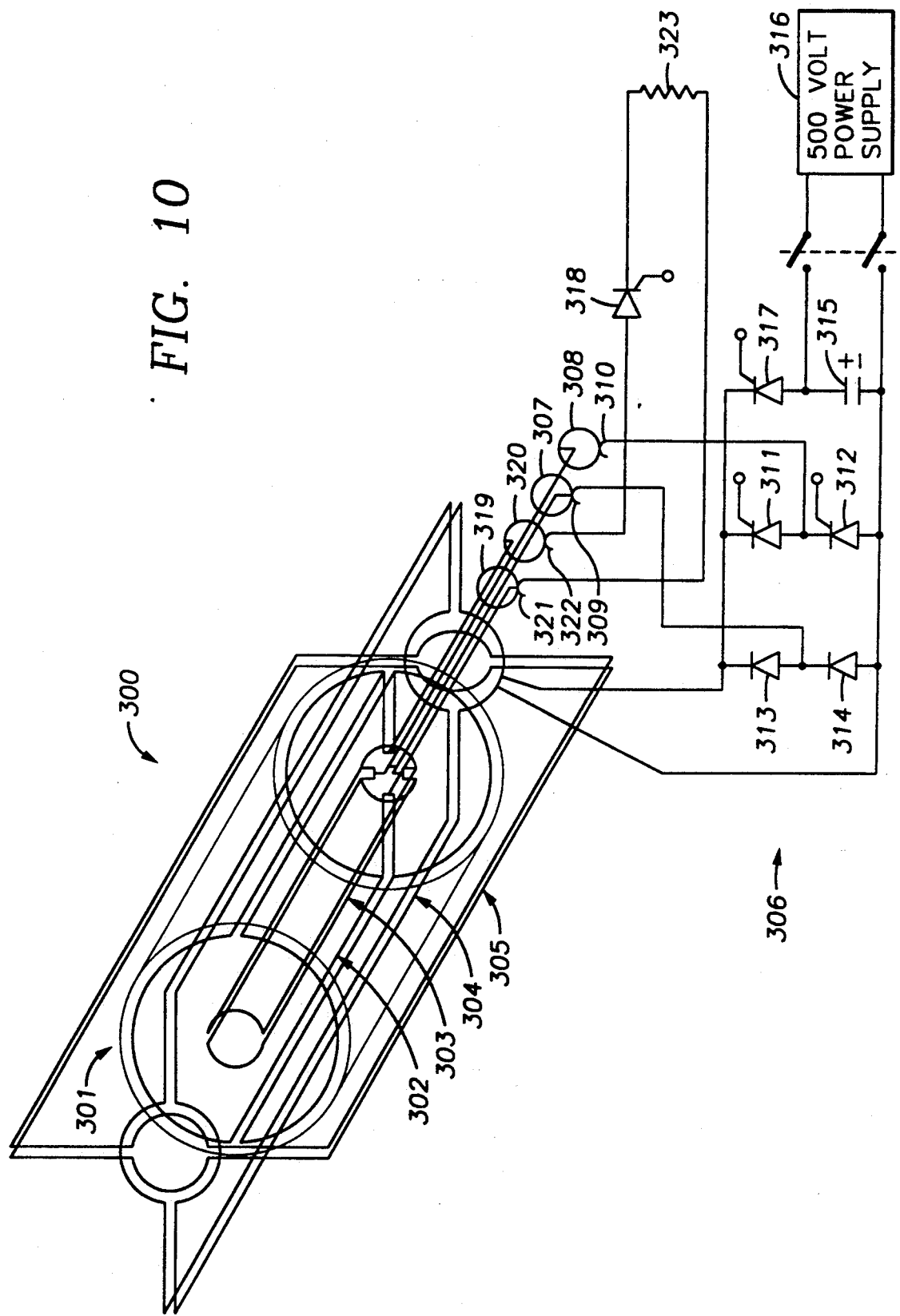
FIG. 10 shows a schematic diagram of electrical circuits of a self-excited, air-core compulsator.

Turning now to FIG. 10, there is shown a schematic diagram of electrical circuits for an air-core compulsator generally designated 300. The compulsator includes a rotor 301 carrying a primary armature winding 302 and an excitation winding 303. The primary armature winding and the excitation winding form two poles that are othogonal to each other about the axis of the rotor 301. The armature winding 302 loops around the periphery of the rotor 301. In contrast, the excitation winding 303 is buried in the rotor 301. The smaller rotor shown in FIG. 12 and the larger rotor shown in FIGS. 13 to 15 each have a respective primary armature winding and a respective excitation winding arranged in the fashion shown for the rotor 301 in FIG. 10.

The compulsator 300 further includes a stationary field winding 304 and a stationary and shorted compensating winding 305. The shorted compensating winding 305 is mounted as close as possible to the outer periphery of the rotor 301 so that almost all of the flux generated by current through the primary armature winding 302 is linked to the compensating winding 305. Therefore, the inductance of the primary armature winding 302 is a function of the angular position of the rotor 301, and the inductance has an abrupt minimum when the poles of the primary armature winding 302 are aligned with the poles of the compensating winding 305.

Stated somewhat differently, as shown in FIG. 10, the primary armature winding 302 and the compensating winding 305 are shown disposed in othogonal relation so that the armature winding 302 has a maximum inductance at this position. When the rotor 301 is rotated 90° about its axis from the position shown in FIG. 10, the inductance of the armature winding 302 becomes a minimum. This modulation of the inductance of the armature winding 302 generates high voltage pulses as a result of magnetic flux within the armature winding 302 interacting with the shorted compensating winding 305. In particular, when the armature winding 302 becomes aligned with the shorted compensating winding 305, a high voltage pulse is generated that is proportional to the current through the armature winding 302 and the maximum rate of change of the inductance of the armature winding 302 as the rotor 301 is rotated.

The air-core compulsator 300 is self-excited by a rectifier bridge circuit 306 interconnecting the excitation winding 303 to the field winding 304. Connections to the excitation winding 303 are made via a pair of slip rings 307 and 308 and respective brushes 309 and 310. After the rotor 301 is brought up to an operating speed, for example, of 500 meters per second at the periphery of the rotor, a pair of silicon-controlled rectifiers 311, 312 are gated on, thereby forming a full-wave bridge with rectifier diodes 313 and 314. At the same time, a capacitor 315, having been charged by a 500 volt power supply 316, is discharged through a silicon-controlled rectifier 317 to provide an initial excitation of the field winding 304. The current in the field winding 304 grows exponentially from the initial current up to a predetermined maximum current, at which time gate current to the silicon-controlled rectifiers 311 and 312 is shut off to avoid any further build-up in the field current. When the silicon-controlled rectifiers 311 and 312 become non-conductive, the field current continues to flow at a rather constant rate through the rectifier diodes 313 and 314.

To extract energy stored in the inertia of the rotor 301, another silicon-controlled rectifier 318 is gated on to close a circuit from the primary armature winding 302 through slip rings 319, 320 and brushes 321, 322 to apply power to a load 323, such as a rail gun. The rail gun, for example, has a size and length selected so that a projectile travels through the gun in the time for one-half revolution of the rotor 301. During one-quarter turn of the rotor 301 to the position shown in FIG. 10, for example, the current applied to the rail gun 323 builds up to approximately a maximum value. This maximum current is maintained during the rotation of another quarter turn of the rotor 301 by an increasing voltage being applied to the rail gun 323 due to the decreasing inductance of the primary armature winding 302 as the primary armature winding becomes closer to alignment with the compensating winding 305. This pulse of energy form the gun is extracted from the inertial energy of the rotor 301 by a corresponding pulse of decelerating torque caused by magnetic force between the current in the primary armature winding 302 and a pulse of "image current" induced in the compensating winding 305 by the rotation of the magnetic field of the current in the primary armature winding.

Further details regarding the operating principles of compensated-pulsed alternators are given in the following publications, which are herein incorporated by reference: Weldon et al., U.S. Pat. No. 4,200,831, issued Apr. 29, 1980; Weldon et al., U.S. Pat. No. 4,935,708, issued Jun. 19, 1990; S. B. Pratap, "Future Trends For Compulsators Driving Railguns," 3rd Symposium on Electromagnetic Launch Technology, 1986, Austin, Texas, Apr. 20–24, 1986, I.E.E.E. Transactions on Magnetics, Vol. MAG-22, no. 6, November 1986; and M. D. Driga et al., "Advanced Compulsator Design," 4th Symposium on Electromagnetic Launch Technology, 1988, Austin, Tex., Apr. 12–14, 1988, I.E.E.E. Publication No. 0018-9464/89/0100-0142501.00, 1989.

Figure 11:
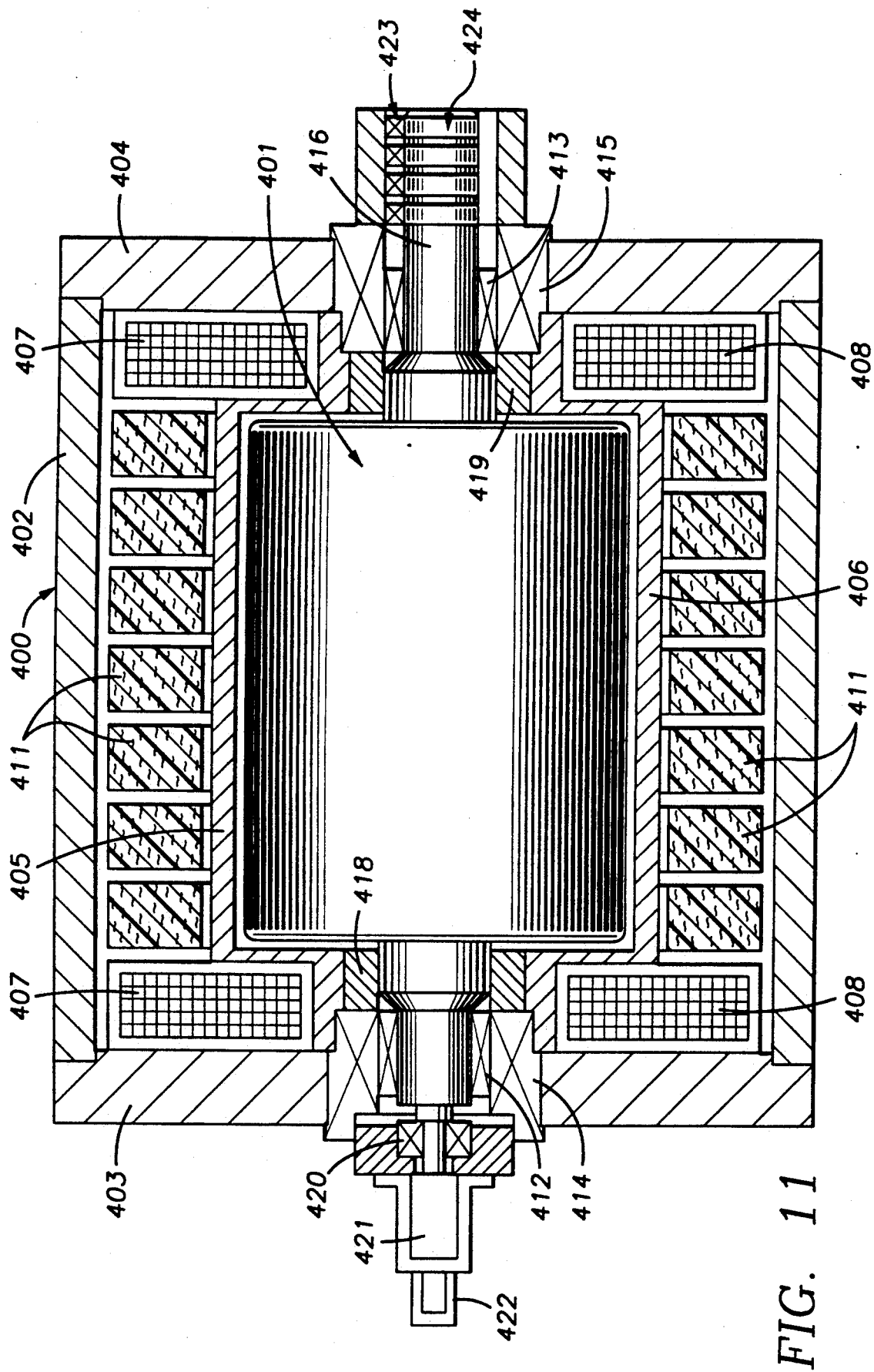
FIG. 11 shows a cross-sectional schematic diagram of a self-excited, air-core compulsator including a small fiber-composite rotor made in accordance with the present invention.

Turning now to FIG. 11, there is shown a schematic diagram of a compulsator generally designated 400 including a rotor generally designated 401 within a housing shown in cross-section along the axis of th rotor. The housing includes a titanium outer casing 402 and end plates 403 and 404.

The cross-section in FIG. 11 is in the plane of the compensating windings 405, 406 and perpendicular to the plane of the field windings 409, 408. The compensating windings include two single turn coils 405, 406, each of which is fashioned from a shell of sheet aluminum. Each of the turns has the appearance of a metal shield. End wraps of an upper portion 407 and a lower portion 408 of the field coils are sectioned in FIG. 11. The remaining portion of the field coils pass longitudinally within a series of hoop-wound fiber composite rings 411. The fiber composite rings 411 resist expansion of the compensating windings 405, 406 and field windings 407 and 408. Each of the upper and lower portions of the field coils is formed from seven laminations of sheet aluminum. Each of the seven laminations is in the form of a shell cut with a spiral pattern to form a multi-turn coil. The coils of the laminations are connected in series to provide a total of 350 turns for the field winding.

To reduce vibrational stresses during high speed rotation, the rotor 401 is journaled to the end plates 403, 404 by bearings 412, 413 mounted in hydraulic dampers 414, 415. To reduce windage loss, the space between the rotor 401 and the stator coils 405, 406, 407, 408 is evacuated to a few torr. To maintain the vacuum, the rotor shaft 416 is sealed by a pair of rotary vacuum seals manufactured by Stein Seal, Inc. Axial movement of the rotor 401 is limited by thrust bearings 420. The rotor 401 is brought up to speed by a hydraulic motor (not shown) coupled by speed increasing gears in a gearbox 421. Once the rotor 401 is brought up to speed, the gearbox 421 is disconnected from the rotor 401 by a clutch 422. Electrical connections to the rotor 401 are made by brushes 423 contacting slip rings 424 mounted on the right end of the shaft 416.

The rotor 401 has a length of 16.7 inches and a radius of 7.8 inches. The rotor is designed for rotation at 25,115 rpm, providing a 530 m/s tip speed. At this speed, the rotor operates above first two ridged body critical speeds (cylindrical and conical modes) but well under (less than two times) the first bending mode. Maximum balance tolerance allowed is according to ISO 1940 G2.5 or 2.75 gm—in per balance plane.

Turning now to FIG. 12, there is shown a detailed longitudinal cross-section of the rotor 401. The shaft 416 is comprised of two ceramic tubes 428, 429. The ceramic tubes 428,429 are composed of silicon nitride ($Si_3N_2$) and manufactured by CERCOM, Inc. of California. The ceramic tubes 428, 429 have an inner radius of 0.0750 inches and an outer radius of 1.940 inches. Upon the ceramic tubes 428, 429, there is fitted a fiber composite tube 430 having an inner radius of 1.940 inches and an outer radius of 2.312 inches. The tube 430 is made of alternate layers of hoop-wound Owens-Corning S-2 glass fibers and axial IM6 graphite fibers in a matrix of epoxy. The tube 430 is slid onto the ceramic tubes 430, 431 without interference.

A series of seven fiber-composite tubes 431, 432, 433, 435, 436 and 437 are press-fitted in sequence onto the tube 430 with increasing interference. Prior to press-fitting each tube, the previous assembly is mounted on a lathe and the outer surface of the previous assembly is precisely ground with a quarter-degree taper and a radius to interfere with the inner surface of the tube to be press fitted. The tube to be press fitted is manufactured with a specified inner radius and a quarter-degree taper by winding fiber on a tapered steel mandrel and coating the fiber with epoxy resin (Shell EPON 9405 (trademark) epoxy) as the fiber is wound. The wound fiber tube is cured with the mandrel in place at a temperature of about 350° F., and the tube automatically separates from the mandrel during cooling to room temperature due to the difference in temperature coefficient of expansion between the fiber composite material, which has a very low temperature coefficient of expansion, and steel. The outer surface of the ground assembly is coated with a thin layer of epoxy (Shell 815 or 816 epoxy) to provide a lubricating and an adhesive effect, and the assembly is mounted in a hydraulic press, a tapered lead-in plug is placed into the tube to be fitted, and then the tube to be fitted is pressed onto the assembly.

The assembly including the tube 430 is ground with a quarter-degree taper to an outer radius of which is 0.002 inches in excess of the inner radius of the tube 431. In other words, the radial interference between the tubes 430 and 431 is 0.002 inches, or stated somewhat differently, the tubes 430 and 431 undergo a radial displacement of 0.002 inches with respect to each other when the tube 431 is pressed onto the tube 430. A tube 431 is made of hoop-wound S-2 fiberglass-epoxy upon a mandrel having an outer radius of 2.312 inches with a quarter-degree taper. The tube 431 is press-fitted onto the tube 430.

Upon the assembly including the tube 431, there is press-fitted a tube 432 of IM6 graphite-fiber epoxy composite including alternate layers of hoop-wound and axial fiber. The tube 432 is made on a mandrel having an outer radius of 2.875 inches with a quarter-degree taper. The assembly is ground with a quarter-degree taper for a radial interference of 0.001 inches with the tube 432.

Upon the assembly including the tube 432, there is press-fitted a tube 433 made of hoop-wound IM6 graphite-fiber epoxy composite material. The tube 433 is wound on a mandrel having an outer radius of 3.390 inches with a quarter-degree taper. The assembly including the tube 432 is ground with a quarter-degree taper for a radial interference of 0.006 inches with the tube 433.

Upon the assembly including the tube 433, there is press-fitted a tube 434 made of hoop-wound S-2 fiberglass epoxy composite material. The tube 434 is wound on a mandrel having an outer radius of 3.880 inches with a quarter-degree taper. The assembly including the tube 433 is ground with a quarter-degree taper for a radial interference of 0.008 inches with the tube 434.

Upon the assembly including the tube 434, there is press-fitted a tube 435 made of hoop-wound S-2 fiberglass epoxy composite material. The tube 435 is wound on a mandrel having an inner radius of 4.360 inches with a quarter-degree taper. The assembly including the tube 434 is ground with a quarter-degree taper for a radial interference of 0.012 inches with the tube 435.

Upon the assembly including the tube 435, there is press-fitted a tube 436 made of hoop-wound S-2 fiberglass epoxy composite material. The tube 436 is wound on a mandrel having an outer radius of 4.752 inches with a quarter-degree taper. The assembly including the tube 435 is ground with a quarter-degree taper for a radial interference of 0.016 inches with the tube 436.

Upon the assembly including the tube 436 is fitted a tube 437 made of hoop-wound S-2 fiberglass epoxy composite material. The tube 437 is wound on a mandrel having an outer radius of 5.300 inches with a quarter-degree taper. The assembly including the tube 436 is ground with a quarter-degree taper for a radial interference of 0.018 inches with the tube 437.

Upon the assembly including the tube 437 there is press-fitted a tube 438 made of alternate layers of hoop-wound and axial S-2 fiberglass-composite epoxy material. The tube 438 is wound on a mandrel having an outer radius of 5.724 inches. The assembly including the tube 437 is ground without any taper so that there is no clearance and no interference between the tube 438 and the assembly including the tube 437. The assembly including the tube 438 is ground to an outer radius of 5.872 inches, without any taper.

Upon the tube 438, there is layered an excitation winding 439 made of aluminum "litz" wire impregnated in epoxy and covered with S-2 fiberglass cloth to provide a layer of somewhat uniform thickness. The "litz" wire is comprised of multiple aluminum filaments, each approximately 20 mils in diameter and insulated from each other except at crimp connections to shaft conductors, such as the shaft conductors 447 and 448. The litz wire is purchased in quarter-inch diameter bundles from New England Wire of Vermont. The aluminum filaments in each bundle are twisted about the axis of the bundle. The multi-filament, twisted construction of the aluminum litz wire permits the magnetic flux from the field coil (407, 408 in FIG. 11) to rapidly penetrate the excitation winding 439 so as to improve the high frequency generating capability of the excitation winding 440.

Upon the litz wire 439, there is press-fitted a tube 440 made of hoop-wound UHM graphite-fiber epoxy composite material. UHM graphite fiber is manufactured by Hercules and has a very high carbon content (99.7) so that it is stiffer, but not as strong, as the IM6 graphite fiber. UHM graphite fiber has a diameter of 0.177 mils, a tensile strength of 500 ksi, and a modulus of 64 msi. The tube 440 is wound upon a mandrel having an outer radius of 6.122 inches with a quarter-degree taper. The outer fiberglass layer over the aluminum litz wire 440 is ground with a quarter-degree taper for an interference of 0.001 inches with the tube 440.

Upon the assembly including the tube 440, there is press-fitted a tube 441 made of S-2 fiberglass epoxy having alternate layers of hoop-wound and axial fiber. The tube 441 is wound on a mandrel having an outer radius of 6.587, without any taper. The assembly including the tube 440 is ground without any taper so that there is no clearance and no interference with the tube 441.

Upon the assembly including the tube 441, there is press-fitted a tube 442 made of hoop-wound UHM graphite-fiber epoxy composite material. The tube 442 is wound on a mandrel having an outer radius of 6.748 inches, with a quarter degree taper. The assembly including the tube 441 is ground with a quarter degree taper for an interference of 0.012 inches with the tube 442. The assembly including the tube 442 is ground to an outer radius of 6.948 inches, without any taper.

Upon the tube 442, there is placed a primary armature winding 443 comprised of aluminum litz wire impregnated with epoxy (Dow 332 epoxy resin) and layered with S-2 fiberglass cloth impregnated with epoxy (Dow 332 epoxy resin). The primary armature winding is arranged in an othogonal relationship to the excitation winding 439 in the fashion described above with respect to FIG. 10. An outer layer of this S-2 fiberglass cloth impregnated with epoxy is ground to an outer radius of 7.438 inches. The ends of the aluminum litz wire are crimp-connected to a pair of shaft conductors similar to the shaft conductors 446 and 448, but disposed in othogonal relation to the shaft conductors 447 and 448 about the axis of the rotor 401. Also fitted over the tube 442 is a hoop-wound S-2 fiberglass-epoxy ring 444 which abuts against the left end of the armature winding 443. The right end portion of the primary armature winding 443 is impregnated in S-2 fiberglass epoxy along with the right end portion of the excitation windings 440 and bonded to a S-2 fiberglass cloth-epoxy end piece 449 which is assembled over the ceramic tube 429 and the shaft conductors 447 and 448.

A hoop-wound IM6 graphite-epoxy banding 451 is press-fitted with a straight press fit and a slight interference of 0.005 inches over an end portion of the end piece 449 overlaying the ceramic shaft tube 429. A silicon nitride ($Si_3N_2$) ceramic ring 452 for vacuum sealing is fitted with a zero clearance, zero interference fit over the graphite banding 451 and using room-temperature curing epoxy (Shell 815 or 828 epoxy) as a lubricant and adhesive. Moreover, at the opposite end of the rotor 410, a hoop-wound IM6 graphite banding 453 is also press-fitted with a straight press fit and a slight interference of 0.005 inches over the ceramic shaft tube 428, and a silicon nitride ($Si_3N_2$) ceramic ring 454 for vacuum sealing is fitted with a zero clearance, zero interference fit over the graphite banding 453 and using room-temperature curing epoxy as a lubricant and adhesive.

Figure 19:
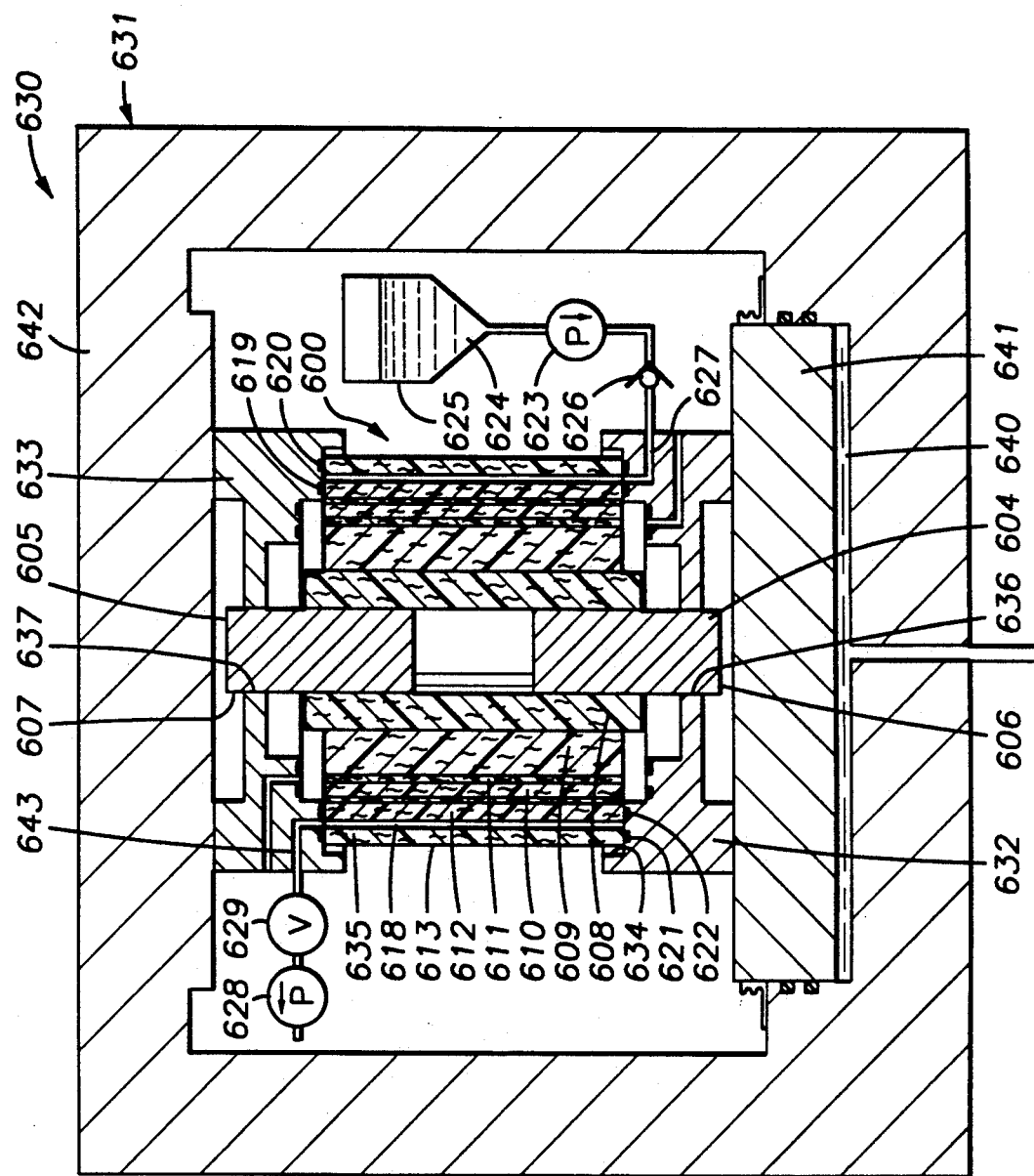
FIG. 19 shows a schematic diagram of an apparatus especially designed for making multi-section rotors.

A hoop-wound UHM graphite-fiber composite armature banding tube 446 was fitted over the end ring 444, the armature winding 443, and the end piece 449, by injecting a mixture of S-2 fiberglass-epoxy bonding agent under a pressure of 3500 psi into an annular region to form an annular bonding layer 445 that was uniform in thickness everywhere. To achieve such a uniform thickness, an apparatus as shown in FIG. 19 and further described below was used to align the banding tube 446 in a precise concentric and coaxial relationship with the underlying assembly during the injection and solidification of the bonding agent.

The banding tube 445 was hoop-wound on a mandrel having an inner radius of 7.440 inches without any taper, and the banding tube had an outer radius of about 7.798 inches. Prior to assembly of the banding tube 445, the fiberglass over the primary armature winding 433 was ground without any taper to provide a 0.002 inch radial clearance with the banding tube. Preferred bonding agent is a room temperature curing epoxy such as Shell 815 or 828 resin mixed with chopped Owens-Corning S-2 glass fibers. After room temperature curing, the assembly was post cured at 150° F. The injection of the bonding agent under pressure caused a radial displacement, or increase in the width of the annular gap between the banding tube 446 and the outer surface of the underlying assembly, of about 0.025 inches. Further details regarding electrical and structural characteristics of a compulsator including a rotor similar to rotor 401 are disclosed in J. R. Kitzmiller et al., "Design of a 660 MW pulsed air-core Compulsator," 1990 International Conference on Electric Machines, MIT, Cambridge, Mass., Aug. 13-15, 1990, incorporated herein by reference.

Figure 13:
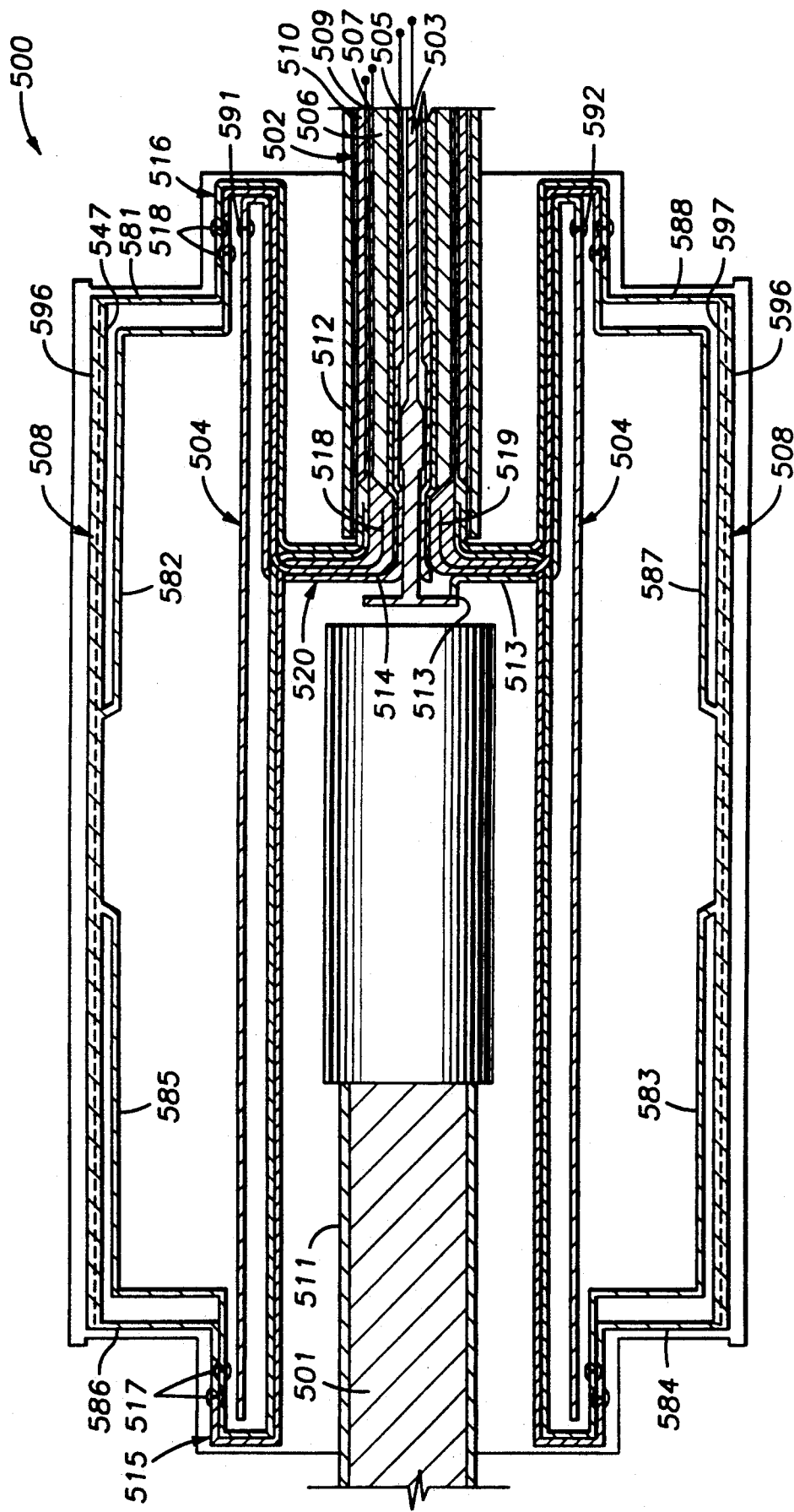
FIG. 13 shows a schematic diagram of a large fiber-composite compulsator rotor made in accordance with the invention.

Turning now to FIG. 13, there is shown a schematic diagram of the electrical connections in a larger compulsator rotor generally designated 500. The rotor 500 is designed for a tip speed of 500 m/s, and has an external radius of 21.8 inches, and a length of 83.2 inches. Inertial energy storage is designed to be 210 MJ and peak electrical output power is designed to be about 10,000 MW. Due to the larger size of the rotor 500, it is desirable to use metal stub shafts, and to more evenly distribute the connections to the armature and excitation windings. As shown in FIG. 13, a stainless steel (type 17-4 PH) stub shaft 501 is used to connect the rotor 500 to an axial thrust bearing and drive gears (not shown). At the opposite end of the rotor 500, a stub shaft generally designated 502 is used including coaxial copper tubes for current conduction and coaxial INVAR (trademark) iron-nickel alloy tubes for structural rigidity while providing a low thermal coefficient of expansion. In particular, the stub shaft 502 includes a center copper rod 503 providing one connection to the excitation winding 504. A copper tube 505 disposed about the copper rod 503 in coaxial relationship, provides a second connection to the excitation windings 504. The copper tube 505 is disposed within an INVAR tube 506. Press-fitted over the INVAR tube 506 is a copper tube 507 providing a first connection to the primary armature windings 508. The copper tube 507 is disposed within still another copper tube 509 providing a second connection to the armature windings 508. The copper tube 509 is press-fitted within a second INVAR tube 510.

The rotor 500 rotates in a peak magnetic flux density of 2.4 tesla. At a rotor speed of 8,600 rpm, very substantial eddy currents are generated in the metal components of the rotor 500. Eddy currents in the shaft 501 are substantially eliminated by tubular electrically conductive shields 511 and 512 fitted over the stub shafts 501 and 502. The shields 511, 512, however, do experience substantial ohmic losses and are therefore cooled by a 0.76 lps. flow rate of an ambient temperature water-glycol solution. The cooling solution is introduced into each stub shaft by a pressurized gallery sealed area on extreme end portions (not shown) of the stub shafts. These pressurized gallery sealed areas are sealed with carbon ring seals (not shown).

Figure 17:
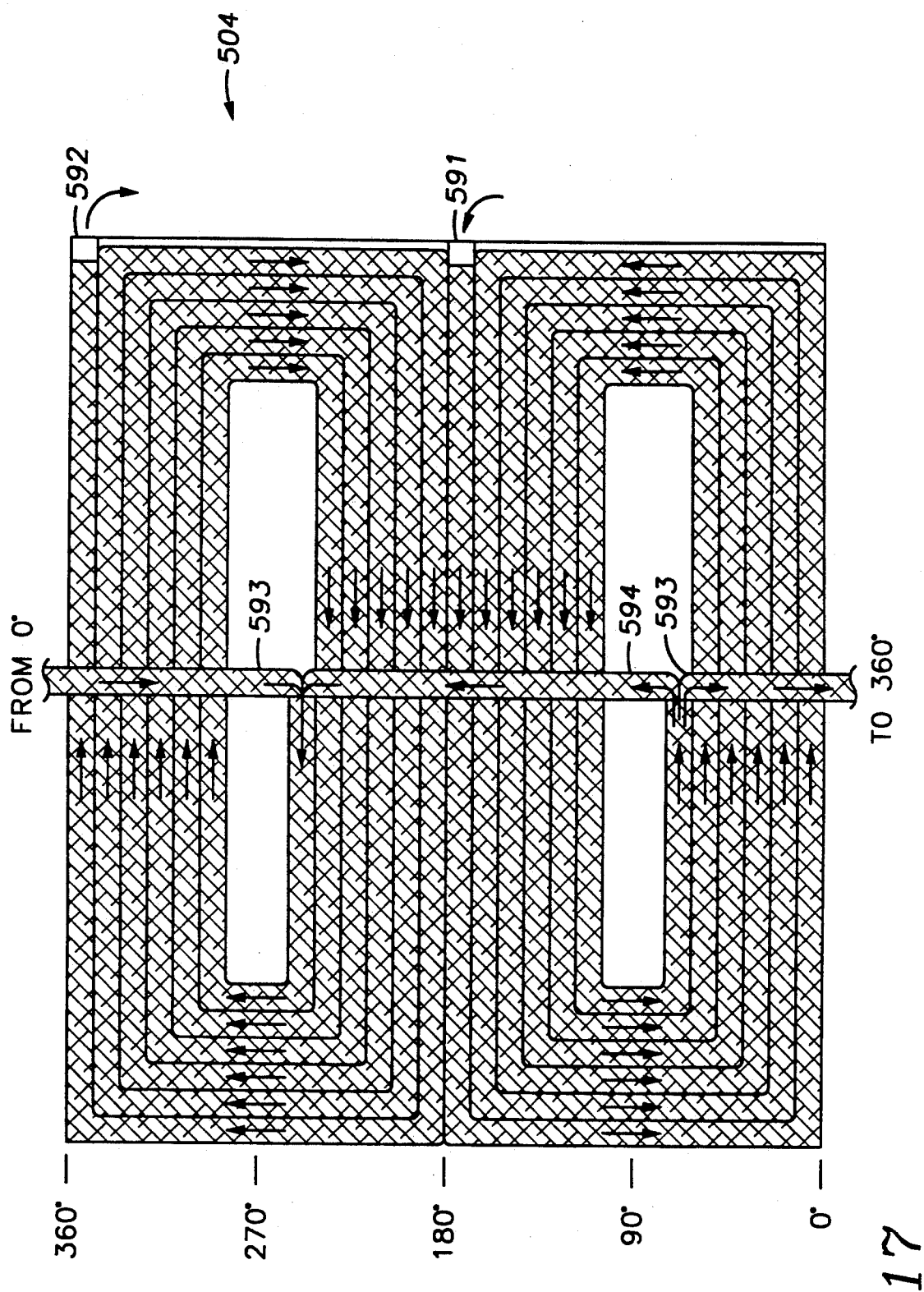
FIG. 17 shows a plan view of a excitation winding for the large compulsator rotor of FIG. 13, as the windings would appear if they were unrolled off the rotor and laid-out flat.

The main armature winding 508 and the excitation winding 504 are two-pole windings arranged in an othogonal configuration similar to the configuration shown and described above with respect to FIG. 10. A plan view of the excitation winding 504, as it would appear unrolled from the rotor 500, is shown in FIG. 17. The excitation winding 504 has 12 turns for each pole and the two poles are connected in series by circumferential windings 593, 594 to provide a total of 24 turns. The direction of current flow through the excitation winding 504 is indicated by arrows. The excitation winding is made of quarter-inch diameter bundles of aluminum litz wire, and the bundles are themselves twisted about each other, in a fashion similar to the twisting of the individual filaments in each bundle. This twisting or transposition of filaments and bundles reduces eddy currents in the litz wire when the litz wire is cut by magnetic flux as the rotor 500 is rotated.

Figure 18:
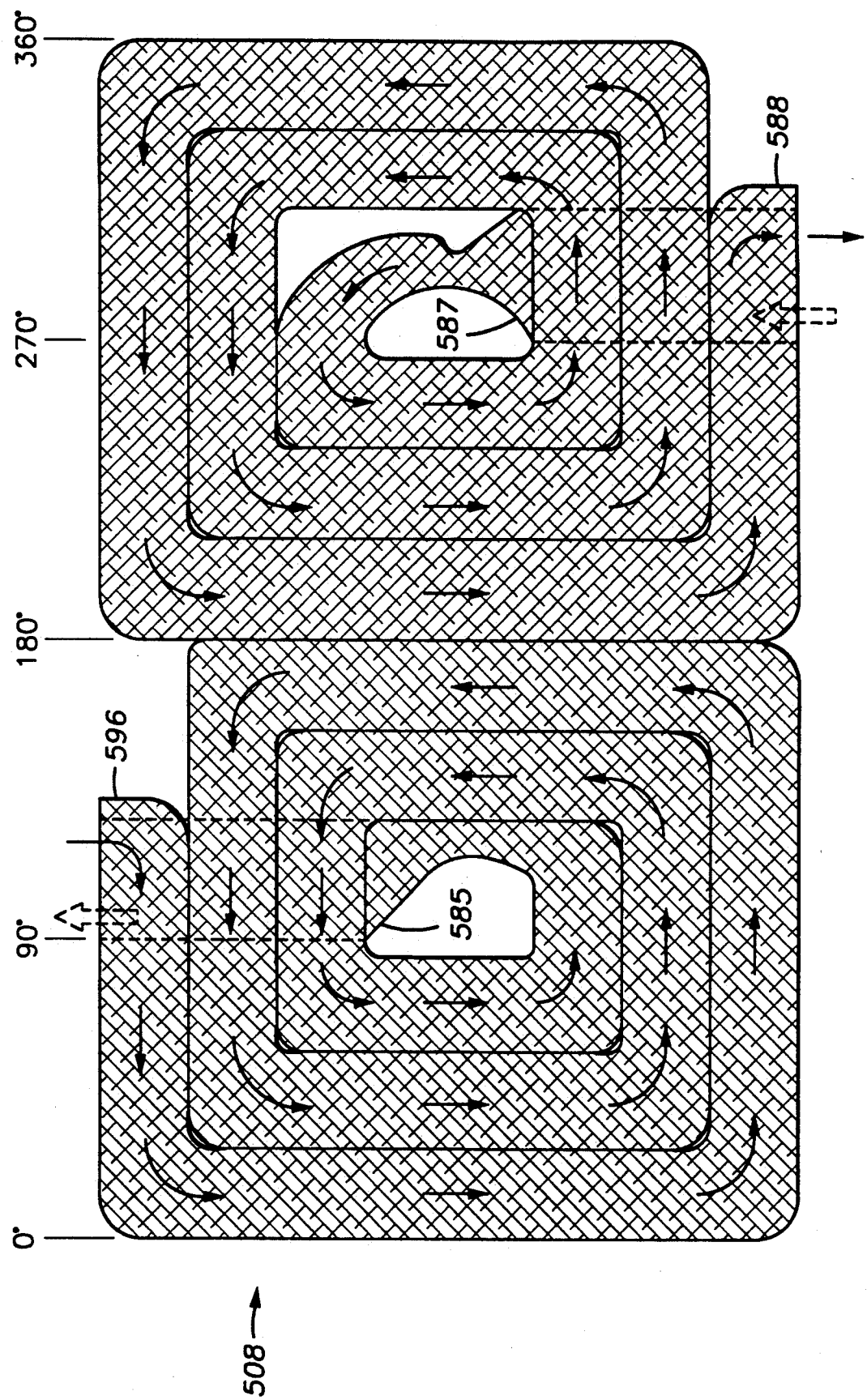
FIG. 18 shows a plan view of a primary armature winding for the large compulsator rotor of FIG. 13, as the windings would appear if they were unrolled off the rotor and laid out flat.

A plan view of the primary armature winding 508 is shown in FIG. 18. The primary armature winding 508 is also a two-pole winding, with six turns per pole, but the windings for the two poles are connected in parallel so that each pole carries half of the peak current generated by the rotor 500. The direction of current flow through the primary armature winding is indicated by arrows. To further balance magnetic forces in the leads of the primary armature windings 508, the primary armature winding consists of two layers 596, 597, each of which has the plan shown in FIG. 18, but the inside layer is circumferentially offset from the outside layer by 180 degrees. This is why eight lead connections to the primary armature winding are shown in FIG. 13. The primary armature winding 508 is made of twisted half-inch diameter bundles of aluminum litz wire. The lead connectors 581, 582, 583 and 584 are made to the inner layer 596 and the lead connectors 585, 586, 587 and 588 are made to the outer layer 597

The conductor of the windings 504, 508 has a rectangular cross-section of a width of 3.35 centimeters and a thickness in the radial direction of 1.65 centimeters. Aluminum litz wire, as described above, is used for the windings 504, 508 to maximize the conductivity to mass ratio. To minimize lead resistance, copper litz lead wires 515, 516, 520 shown in FIG. 13 are used for making connections from the shaft conductors 503, 505, 506, and 509 to windings 504, 508. The litz lead wire for one end of the excitation windings 504 is connected by crimp connections 513 to the central copper rod 503, and the litz lead wire for the other end of the excitation winding 504 is connected by crimp connections 514 to the copper tube 505. The crimp connections are made by tinning small bundles of the lead wire with solder, drilling small holes axially into the copper rod or tube about the periphery of the rod or tube, inserting the tinned bundles into the holes in the copper tube, and indenting the face of the tube 505 next to the holes to crimp the tinned bundles into the holes.

Connections between the copper litz lead wire and the aluminum litz windings are made by tieing small bundles of the lead wire, and inserting the copper and aluminum litz wire bundles into opposite ends of copper tubes about two inches long and one-quarter inches in diameter, and crimping the periphery of the end portions of the copper tubes to secure the copper and aluminum litz wire bundles into the tubes. The copper litz to aluminum litz crimp connections 517, 518 for the primary armature winding 508 are disposed at an intermediate radial position near the ends of the rotor 500, as shown in FIG. 13. The copper litz to aluminum litz crimp connections 591, 592 for the excitation winding 504 are also disposed near the ends of the rotor 500, but these crimp connections are disposed at the radial position of the excitation winding.

In contrast to the smaller rotor 401 of FIG. 12, the larger rotor 500 of FIG. 13 distributes the "dead weight" of the lead wires to the excitation and primary armature windings over the length of the rotor. For structural integrity, the litz wires are vacuum impregnated with an S-2 fiberglass cloth reinforced epoxy.

Assembly of the rotor is accomplished by starting with the stub shafts 501, 502 and installing additional layers, many of which are interference fit onto the substructure. Half of the litz wire lead conductor for the armature winding 500 branches off to one end of the rotor and the other half branches off to the other end of the rotor. Lead wires to the excitation winding 504, however, all branch off to the right end of the rotor, and fiber-composite tubes are slipped over the branched lead wires. To ensure dynamic balance, the lead wires, as well as the excitation and primary armature winding, are laid out in a radially symmetric fashion, as suggested by the radially symmetric schematic diagram of FIG. 13. A detailed cross-section of the upper right quadrant of FIG. 13 is shown in FIG. 14, and a detailed cross-section of the upper left quadrant of FIG. 13 is shown in FIG. 15. Detailed cross-sections in a plane perpendicular to the axis of the rotor 500 are shown in FIGS. 16A (mid-section) and 16B (through stub-shaft 502).

Figure 14:
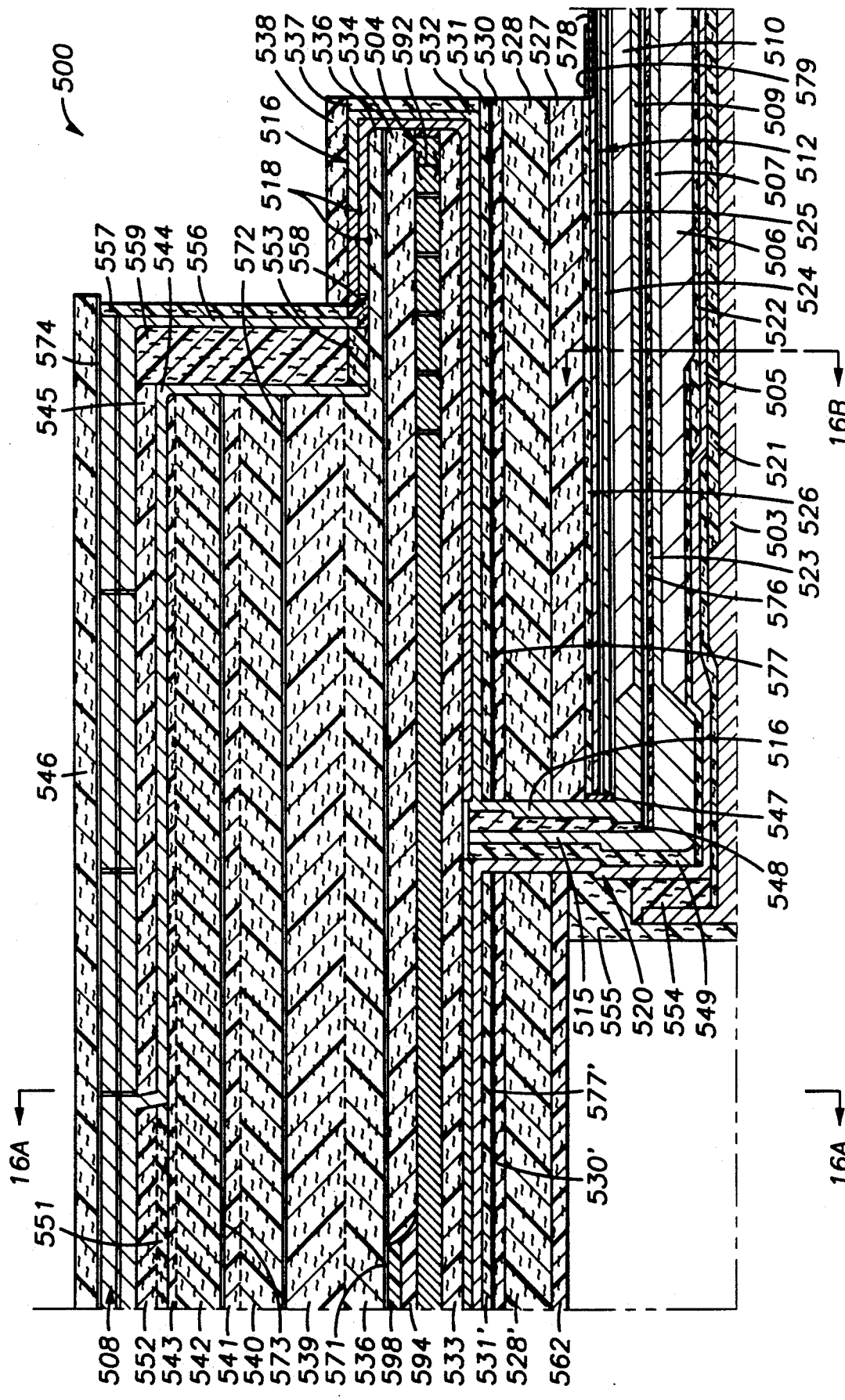
FIG. 14 shows a detailed longitudinal cross-sectional view of the upper right quarter section of the large compulsator rotor of FIG. 13.

Turning now to FIG. 14, there are shown the fiber-composite components of the rotor 500. The copper rod 503 is separated from the copper tube 505 by a tube 521 of hoop-wound S-2 fiberglass epoxy. The tube 505 is also separated from the INVAR tube 506 by a hoop-wound S-2 fiberglass-epoxy tube 522. The copper tube 507 is also separated from the copper tube 509 by a layer of S-2 fiberglass epoxy 523. The rod 503 and the tubes 521, 505, 522, 507 and 523 are assembled with zero clearance, zero interference fits. Then the tubes 509, 510 are assembled together with a zero clearance, zero interference fit, and this sub-assembly is slid over the assembly of the rod 503 and the tubes 521, 505, 522, 507 and 523 with a slight radial clearance of about 0.002 inches. Fiberglass-epoxy bonding agent is injected into the annulus between the tube 509 and the tube 523 to form a continuous annular layer 576 of bonding agent of approximately uniform thickness everywhere. The bonding agent was injected and solidified under a pressure of about 6500 psi using an apparatus and method similar to the apparatus and method described below with reference to FIGS. 19 and 20.

The eddy-current shield 512 is comprised of two magnesium-zirconium-copper alloy tubes 524, 525. Channels are cut in the inner and outer surfaces of the tube 524 for the flow of coolant. Although the eddy current shield 512 is liquid cooled, it still experiences a substantial temperature rise that could damage conventional fiber-composite epoxy material. Therefore, a sleeve 526 of Franklin Lamitext G-Etronax Pl brand of fiberglass-cloth polyamide resin composite material fitted over the eddy-current shield 512. The sleeve 526 has an inner radius of 4.500 inches and an outer radius of 4.600 inches.

The eddy current shield 524, 525 is thermal shrink-fitted with a 0.008 inch radial interference onto the assembly including the tube 510. Then the heat shield tube 526 is press-fitted with a 0.0005 inch radial interference into an outer hoop-wound IM6 graphite-fiber epoxy tube 527, and this sub-assembly is press-fitted over the underlying assembly including the heat shield tube 526. Unless otherwise specified, all press-fitting between fiber-composite components uses room-temperature curing epoxy (Shell 815 or 828) as a lubricant and adhesive.

A series of tubes 528, 530, 531 are fit into each other to form a sub-assembly. The tube 528 is made of hoop-wound S-2 fiberglass-epoxy, and it is wound on a mandrel having an outer radius of 6.000 inches. The tube 530 is made of hoop-would IM6 graphite-fiber epoxy, and it is wound on a mandrel having an outer radius of 7.000 inches. The tube 531 is made of hoop-wound S-2 fiberglass-epoxy, and is wound on a mandrel having an outer radius of 8.150. The tube 530 is ground for a radial clearance of about 0.002 inches with respect to the inner surface of the tube 531. Fiberglass-epoxy bonding agent is then injected into the annulus between tube 530 and 531 to form a continuous annular layer 577 of bonding agent of approximately uniform thickness everywhere. The bonding agent is injected and solidifies under a pressure of about 150 psi using an apparatus and method similar to the apparatus and method described below with respect to FIGS. 19 and 20. The outer surface of the tube 528 is then ground for a no clearance, no interference fit with the inner surface of the tube 530. Then the tubes 530, 531 are press fit onto the tube 528.

The sub-assembly of the tubes 528, 530, 531 is press fit onto the stub-shaft assembly including the tube 527. The tube 527 is ground a radial interference of 0.0045 inches with respect to the tube 528.

The outer surface of the tube 531 is ground to a radius of 8.400 inches, to serve as a support for the lead conductors 520 to the excitation winding 504 and the lead conductors 515, 516 to the primary armature winding 508. A heat shield end ring 547, made of Franklin Lamitext G-Etronax P1 brand of fiberglass-cloth polyamide resin composite material, is fitted over the left end of the eddy current shield 512 made of the tubes 524, 525. Crimp connections, as described above, are made between the lead conductors and the copper rod 503 and tubes 505, 507, 509. The lead conductors are then extended radially about the left end of the right stub-shaft assembly, and bonded with S-2 fiberglass epoxy to the stub-shaft assembly and G-10 fiberglass epoxy rings 548 and 549. Some of the S-2 fiberglass epoxy bonding to the excitation leads 520 forms a hub 554, which is encased over an end hub 555 of G-10 fiberglass-epoxy. Half of the primary armature lead wires and all of the excitation lead wires are folded back over the outer periphery of the tube 531.

Figure 15:
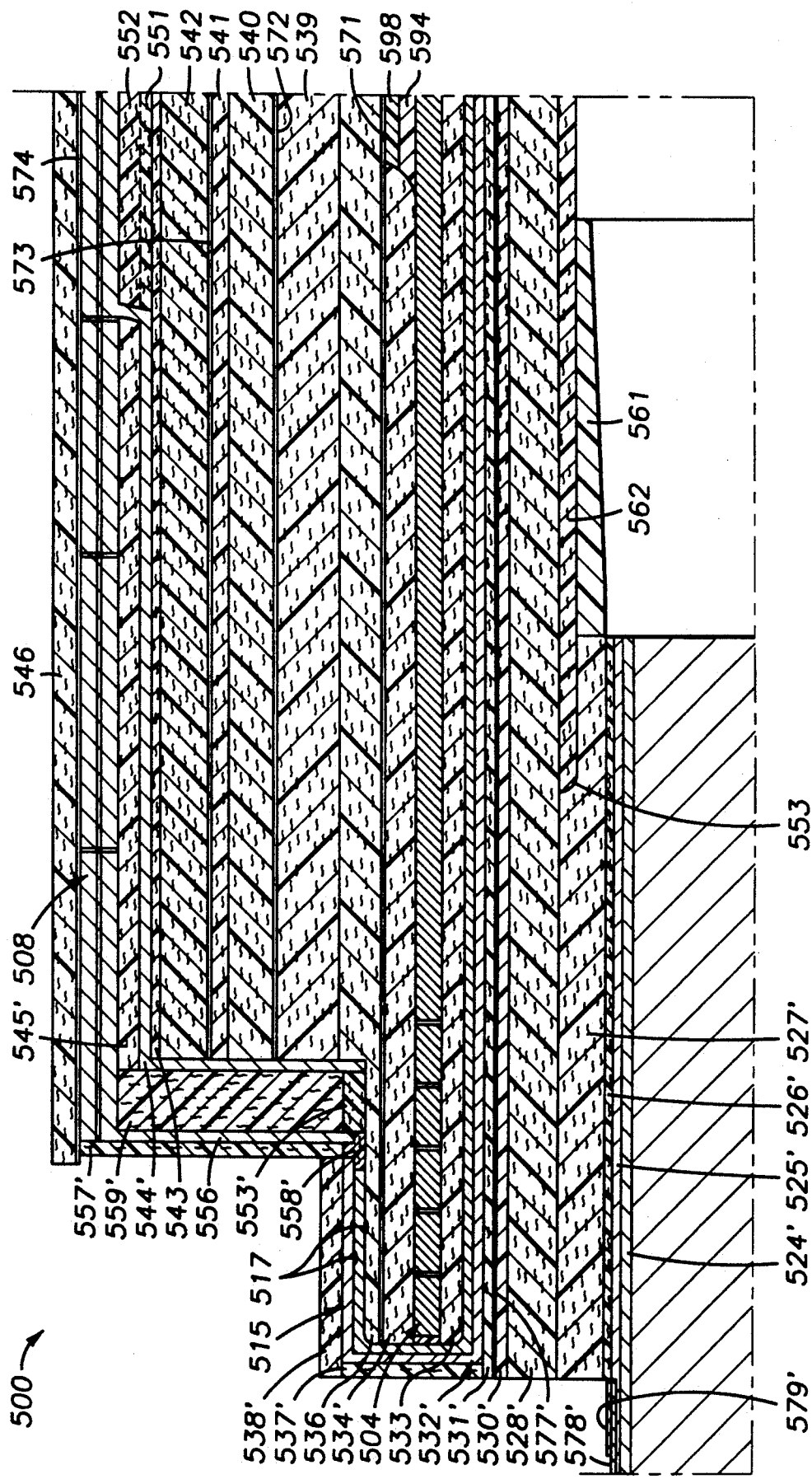
FIG. 15 shows a detailed longitudinal cross-sectional view of the upper left quarter section of the large compulsator rotor of FIG. 13.
Figure 16A:
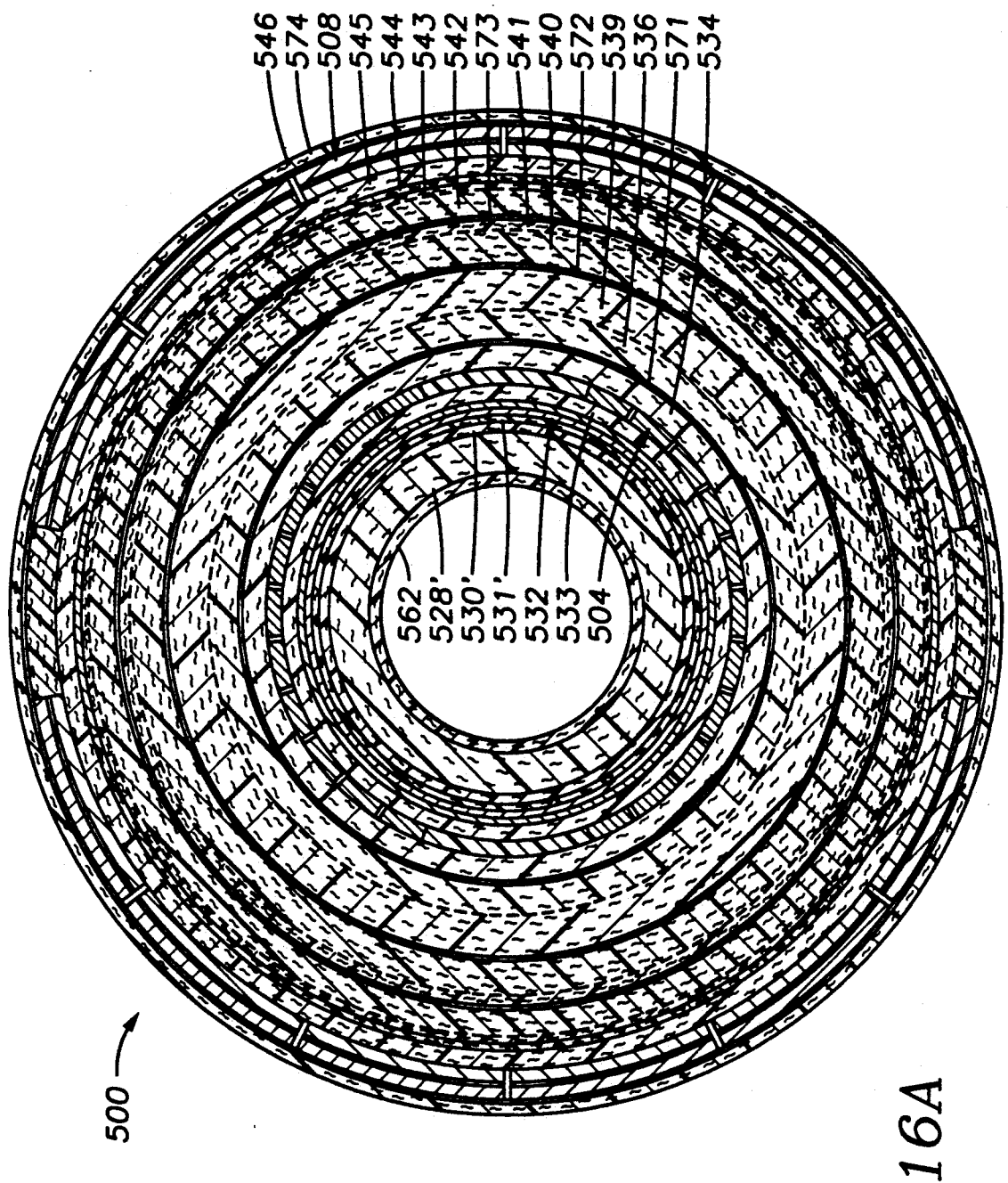
FIG. 16A shows a detailed cross-sectional view of the large compulsator rotor of FIG. 13 in a plane perpendicular to the axis of the rotor along section line 16A—16A in FIG. 14.

A left stub-shaft assembly, further shown in FIG. 15, is completed at this time. The left stub-shaft assembly has components 524', 525', 526', 527', 528', 530', and 531' that are similar to the components of the right stub-shaft assembly. The similar components are designated with similar, but primed, reference numerals. The left-stub shaft assembly also includes a sub-assembly of a tapered stiffening ring 561 made of hoop-wound S-2 fiberglass epoxy, and a tube 562 of alternate layers of axial and hoop-wound S-2 fiberglass epoxy. The end hub 555 serves as a connector between the left stub shaft assembly shown primarily in FIG. 15 and the right stub-shaft assembly shown in FIG. 16A, when the right ends of the tubes 552, 528', 530', 531' are fitted over the end hub 555.

Returning now to FIG. 14, the lead wires 532 are then laid over the layers 531, 531' and bonded with some hoop-wound S-2 fiberglass epoxy cloth. Then a tube of 533 of hoop-wound S-2 fiberglass epoxy is loosely fit over the lead conductor layer 532. The tube 533 has an outer radius of 9.750 inches and an inner radius of 9.000 inches.

Then the excitation winding 504 is wound as a flat assembly onto a flat S-2 fiberglass cloth, as shown in FIG. 17, and bonded to the cloth with room-temperature curing epoxy adhesive. Then the cloth, with the winding, is wound on a mandrel, and the winding is over-wrapped with S-2 fiberglass and epoxy. The winding is then transferred, with a zero-interference fit, onto the tube 533, and crimp connections 591, 592 are made to the excitation winding.

The assembly is then placed in a steel clamshell mold having end pieces which clamp the stub shafts in precise coaxial alignment. The mold is evacuated, and then epoxy encapsulant (Dow 332 resin) is pumped into the mold to a pressure of about 5 to 10 psi. The encapsulant cures at room temperature, and is post cured at 150° F. After post-curing, the assembly is removed from the mold.

A pair of tubes 534, 534' of hoop-wound IM6 graphite-fiber epoxy are each wound on a mandrel having an outer radius of 10.500 inches and a taper of a quarter of a degree. Excess fiberglass and epoxy is ground off of the excitation winding 504, for an interference of 0.024 inches with the tubes 534, 534'. The tubes 534, 534' are then press-fitted from each end of the rotor over the layer of excitation winding. A hoop-wound IM6 graphite-composite banding 598 is wound on a mandrel having an outer radius of 11.50 and a 0.1° taper. For assembly over the circumferential winding 594, excess fiberglass-epoxy is ground from the outer surface of the circumferential winding with a 0.1° taper to provide a radial interference of 0.024 inches with respect to the inner radius of the banding. Then the banding 598 is press-fitted over the circumferential winding.

A tube 536 of hoop-wound S-2 fiberglass epoxy is wound on a mandrel having an outer radius of 11.500 inches. When the fiberglass winding reaches an outer radius of 13.000 inches, and before curing of the epoxy, hoop-wound IM6 graphite fiber is wound on the same mandrel directly on top of the fiberglass to an outer radius slightly in excess of 15.000 inches to form a graphite-epoxy tube 537 integral with the fiberglass-epoxy tube 536. After curing of the epoxy of the tubes 536, 539, the outer surface of the tube 539 is ground to an outer radius of 15.000 inches, and the assembly including the tube 534 is ground to an outer radius having a 0.002 inch radial clearance with the inside radius of the tube 536. The tubes 536, 539 are then assembled with the assembly including tube 534, and fiberglass epoxy bonding agent is injected under a pressure of 2,800 psi into the radial gap of 0.002 inches between the outer cylindrical surface of the tube 534 and the inner cylindrical surface of the tube 536, using the apparatus shown in FIG. 19 and further described below to align the tubes 536, 539 in precise coaxial and concentric relationship with the assembly including the tube 534 during the injection and solidification of bonding agent under the pressure of 2,800 psi. This precise coaxial and concentric alignment ensures that a continuous annular layer of bonding agent 571 of uniform thickness everywhere is formed that completely fills the annular region between the cylindrical outer surface of the tube 534 and the cylindrical inner surface of the tube 536. Under the pressure of 2,800 psi, the radial gap between the cylindrical outer surface of the tube 536 and the cylindrical inner surface of the tube 536 expands from about 0.002 inches to 0.021 inches. After solidification of the bonding agent under the pressure of 2800 psi, the finished product retains in it about 2,800 psi of radial stress induced in it by the presence of the cured bonding agent 571.

In a similar fashion, a tube 540 of hoop-wound S-2 fiberglass epoxy is wound on a mandrel having an outer radius of 15.000 inches. When the fiberglass winding reaches an outer radius of 16.500 inches, and before curing of the epoxy, hoop-wound IM6 graphite is wound on the same mandrel directly on top of the fiberglass to a radius slightly in excess of 17.000 inches to form a graphite-epoxy tube 541 integral with the fiberglass-epoxy tube 540. After curing of the epoxy of the tubes 540, 541, the outer surface of the tube 541 is ground to an outer radius of 17.000 inches, and the assembly including the tube 539 is ground to an outer radius having a 0.002 inch radial clearance with the inside radius of the tube 540. The tubes 540, 541 are then assembled with the assembly including the tube 539, and fiberglass epoxy bonding agent is injected under a pressure of 3,450 psi into the radial gap of 0.002 inches between the tube 539 and the tube 540, using the apparatus shown in FIG. 19 and further described below to align the tubes 540, 541 in precise coaxial and concentric relationship with the assembly including the tube 539 during the injection and solidification of bonding agent under the pressure of 3,450 psi. This precise coaxial and concentric alignment ensures that a continuous annular layer of bonding agent 572 of uniform thickness everywhere is formed in the annular gap between the cylindrical outer surface of the tube 539 and the cylindrical inner surface of the tube 541. Under the pressure of 3,450 psi, the radial gap between the cylindrical outer surface of the tube 539 and the cylindrical inner surface of the tube 541 expands from about 0.002 inches to 0.040 inches. After solidification of the bonding agent under the pressure of 3,450 psi, the finished product retains in it about 3,450 psi of radial stress induced in it by the presence of the cured bonding agent 572.

In a similar fashion, a tube 542 of hoop-wound S-2 fiberglass epoxy is wound on a mandrel having an outer radius of 17.000 inches. When the fiberglass winding reaches an outer radius of 18.500 inches, and before curing of the epoxy, hoop-wound IM6 graphite is wound on the same mandrel directly on top of the fiberglass to an outer radius slightly in excess of 18.820 inches, to form a graphite-epoxy tube 543 integral with the fiberglass-epoxy tube 542. After curing of the epoxy of the tubes 543, 542, the outer surface of the tube 543 is ground to an outer radius of 18.820 inches, and the assembly including the tube 541 is ground to an outer radius having a 0.002 inch radial clearance with the inside radius of the tube 542. The tubes 543, 542 are then assembled with the assembly including the tube 541, and fiberglass-epoxy bonding agent is injected under a pressure of 6,000 psi into the radial gap of 0.002 inches between the tube 541 and the tube 542, using the apparatus shown in FIG. 19 and further described below to align the tubes 543, 542 in precise coaxial and concentric relationship with the assembly including the tube 541 during the injection and solidification of bonding agent under the pressure of 6,000 psi. This precise coaxial and concentric alignment ensures that a continuous annular layer of bonding agent 573 of uniform thickness everywhere is formed in the annular gap between the cylindrical outer surface of the tube 542 and the cylindrical inner surface of the tube 541. Under the pressure of 6,000 psi, the radial gap between the cylindrical outer surface of the tube 542 and the cylindrical inner surface of the tube 541 expands from about 0.002 inches to 0.080 inches. After solidification of the bonding agent under the pressure of 3,450 psi, the finished product retains in it about 3,450 psi of radial stress induced in it by the presence of the cured bonding agent 573.

Figure 16B:
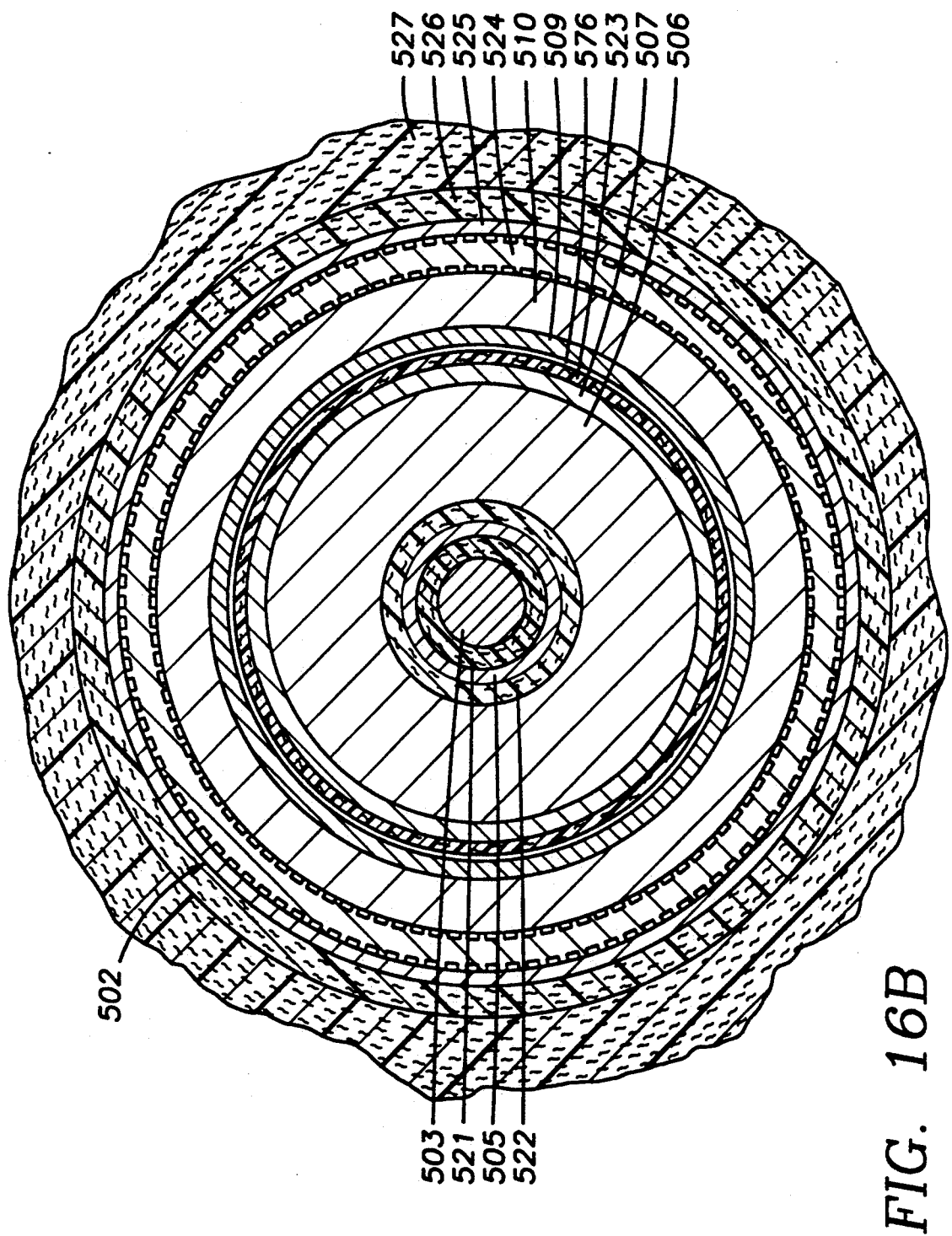
FIG. 16B shows a detailed cross-sectional view of a stub-shaft of the large compulsator rotor of FIG. 13 in a plane perpendicular to the axis of the rotor along section line 16B in FIG. 14.

The series of layers 534, 571, 536, 539, 572, 540, 541, 573, 542, and 543 comprise a multi-section flywheel for inertial energy storage for the rotor 500. Each section 536, 539), (540, 541), (542, 543) that is external to an annular layer of bonding agent 571, 572, 573 has an outer tube or winding of relatively stiff fiber (such as IM6 graphite) and an inner tube or winding of relatively compliant fiber (such as S-2 glass). Preferably, the outer tube or winding is integral with the inner tube or winding, for example, by being wound or imbedded in the same epoxy matrix material. In this particular example, such an integral assembly of tubes or windings is made by winding the relatively stiff fiber onto the relatively complaint fiber before curing of the epoxy resin coating of the fibers, so that when the epoxy of the wound assembly is cured, the epoxy matrix is integral without any detectable interface in the epoxy matrix. In FIGS. 14 to 16, the boundary between the different fiber materials in the continuous epox matrix is indicated by dashed lines.

About each of the annular bonding layers 571, 572, 573 there is an inner cylinder, and an outer cylindrical section including an inner tube of relatively compliant fiber-composite material and an outer tube of relatively stiff fiber-composite material. This peculiar construction has two distinct advantages. First, it provides a flywheel in which radial prestress induced by the presence of the annular layer of bonding agent maintains a state of compression at high rotational speeds with just one such annular layer of bonding agent that is comparable to a structure using just one kind of fiber material and an additional layer of bonding agent that should otherwise be present at the location between the relatively compliant fiber-composite material and the relatively stiff fiber-composite material, to obtain the desired stress distribution comparable to stress distribution described above with respect to FIGS. 6B and 7. Therefore, the time and labor for manufacturing the flywheel is reduced by reducing the number of times bonding agent is injected and solidified under pressure in the assembly process.

The second advantage follows from the fact that stiffer reinforcing fiber, such as graphite, is more expensive than more compliant fiber, such as glass. Therefore, the desired stress distribution for a multi-section flywheel is obtained not only by using fewer injections of bonding agent, but also by using less expensive reinforcing fibers, such as glass, for most of the reinforcing fibers. In FIG. 14, a majority of glass fiber was used for the flywheel of the rotor 500. Moreover, the integral assembly of layers 539 and 536 had more graphite than glass for restraining radial growth due to "dead weight" of the underlying excitation windings, and in a flywheel that did not have such dead weight, the layers 539 and 536 could also have more glass fibers than graphite fibers.

Another advantage to the peculiar flywheel structure of the rotor 500 of FIG. 14 is that no radial displacement or interference is needed between the layers of relatively compliant fiber-composite material and the layers of relatively stiff fiber-composite material. Therefore, these two layers can be wound in an integral matrix, for example, by curing epoxy matrix material after the stiffer fiber-composite material is wound directly on top of the more compliant material. This results in a stronger flywheel, because de-lamination of the stiffer fiber-composite material from the more compliant fiber-composite material would occur not when the radial stress just becomes tensile as the rotational speed of the flywheel increases, but when the radial stress becomes more tensile than the tensile strength of the matrix material.

For retaining the lead wires 516 to the primary armature winding 508, two fiberglass rings 553, 558 are molded from epoxy and chopped S-2 glass. The rings are molded with a nominal inner radius of 12.000 inches and a quarter-degree taper, and seating surfaces are ground on the outer surface of the tube 536 to provide a radial interference of 0.013 inches with the ring 553, and 0.011 inches with the ring 558.

A hoop-wound UHM graphite-fiber end ring 537 0.500 inches thick is wound on a mandrel having an inner radius of 8.385 inches. The end ring is wound to an outer radius slightly in excess of 12.750 inches. The end portion of the 8.400 inch radius outer cylindrical surface of the tube 531 is ground with a radial interference of 0.005 inches with the inner surface of the end ring 537. The copper lead litz wire 516 is routed over the ends of the rotor 500 and tacked down with epoxy adhesive. Then the end ring 537 is press-fitted onto the tube 531.

A hoop-wound ring 559 of IM6 graphite epoxy having a thickness of 2.000 inches and an outer radius of 19.850 inches is wound on a mandrel having an outer radius of 12.750 inches.

Rings 558', 559', 555', and 537' (FIG. 15) are also made for the left end of the rotor shown in FIG. 15. Assembly of these components is performed coincident with the similar components for the right end of the rotor 500. Crimp connections 518 are made between the copper litz primary armature lead wires 516 and the aluminum litz of the primary armature windings 508, and the copper lead litz wire 516 is routed over the ends of the rotor 500 and tacked down with epoxy adhesive. Then the rings 553, 558 are press fitted over the aluminum litz wire onto the tube 536.

Upon the tube 543, there is assembled a tube 551 of hoop-wound S-2 fiberglass-epoxy integral with a tube 552 of hoop-wound IM6 graphite-fiber epoxy. The tube 551 is formed by winding the S-2 glass fiber onto a mandrel having an inner radius of 18.500 inches until the glass winding reaches an outer radius of 19.150 inches, and the tube 552 is formed integral with the tube 551 by winding graphite fiber directly onto the glass fiber to an outer radius slightly in excess of 19.850 inches before curing of epoxy impregnating the windings. The tubes 551, 552 are assembled into the tube 543 with a no-interference fit and epoxy adhesive. Then a layer 544 is formed by overwrapping leads of the primary armature winding 508 with S-2 fiberglass cloth and epoxy to bond the leads to the outer surface of the tube 543. A hoop-wound IM6 graphite-epoxy tube 545 (and the similar tube 545' shown in FIG. 13) is wound on a mandrel having an outer radius of 19.150 inches. Excess fiberglass-epoxy over-wrap is then ground off of the layer 544 for a radial interference of 0.016 inches with the tube 545. The tube 545 is press-fitted onto the layer 544. The tube 545' is also assembled over the layer 544 in a similar fashion. Then end pieces 559, 559' are press-fitted onto the end rings 553, 553', and the armature leads 556, 556' are crimp-connected at their connectors 518, 518'. The armature leads are bonded to the end pieces 559, 559', and the connectors 518, 518' are overwrapped with fiberglass cloth and epoxy. A pair of hoop-wound IM6 graphite-epoxy end discs 557 and 557' are wound on a mandrel, having an outer radius of 12.800 inches. A pair of hoop-wound IM6 graphite-epoxy bandings 538, 538' are would over a mandrel having an inner radius of 12.750 inches. The outer surface of the rings 558, 558' are ground for an interference of 0.016 inches with the inner radius of the end discs 557, 557'.

The outer surfaces of the tubes 545, 545' are ground for a radial interference of 0.016 inches with respect to the respective inner surface of the end discs 557, 557'. The primary armature leads 556, 556' are coated with epoxy adhesive, and the end discs 557, 557' are press-fitted onto their respective rings 558, 558'. Then the armature windings 508 are laid-out, as shown in FIG. 18 and as described above, tacked-down with epoxy adhesive, and overwrapped with S-2 fiberglass cloth. Then the excess fiberglass and epoxy overwrapping the connectors 518, 518' are ground for a radial interference of 0.016 inches with respect to the inner surface of the bandings 538, 538'. The bandings are then press-fitted over the connectors.

At this point, the rotor assembly is clamped into a steel clamshell mold for impregnation of the armature windings and armature lead wires. The mold is evacuated, and epoxy encapsulant is pumped into the mold to a pressure of about 5 to 10 psi. After curing at room temperature and a post-cure of 150° F., the encapsulated rotor assembly is removed from the mold.

An armature banding 546 of hoop-wound UHM graphite-epoxy is wound on a mandrel having an outer radius of 21.000 inches. This banding is 69.5 inches long and 0.800 inches thick. The encapsulated rotor assembly is mounted on a lathe, and its outer surfaces are precisely ground. Excess fiberglass-epoxy over the armature windings 508 are ground for a radial clearance of 0.002 inches with respect to the inner radius of the banding 546, and the outer surface of the banding 538, 538' is ground to an outer radius of 13.500 inches.

The banding 546 is assembled over the primary armature windings 508 and aligned in a hydraulic press in an arrangement similar to the arrangement shown in FIG. 19 and further described below for the injection and solidification of bonding agent under pressure. Room temperature setting epoxy and chopped S-2 fiberglass is injected into an annular region between the outer cylindrical surface of the primary armature layer 508 and the inner cylindrical surface of the banding 546 to form a continuous annular layer 574 of bonding agent of uniform thickness everywhere. To ensure that the bonding agent completely fills the annulus between the outer cylindrical surface of the primary armature layer 508 and the inner cylindrical surface of the banding 546, the annulus is evacuated prior to injection of the bonding agent. The bonding agent is injected at a pressure of 4500 psi, causing the annulus between the outer cylindrical surface of the primary armature winding layer 508 to expand from a radial gap of 0.002 inches to a radial distance of 0.070 inches. The pressure is maintained while the bonding agent cures and is post-cured at 150° F. Therefore, in the finished product, the presence of the annular layer of bonding agent 574 induces a compression radial prestress of about 4500 psi in the banding 546 and in the underlying armature winding layer 508.

Finally, type 17-4 PH stainless steel bushings 578 and 579 are press-fitted over the outer layer 525 of the eddy current shield 512. The bushings are each 0.150 inches thick, and they are press-fitted with a radial interference of 0.0008 inches. Similar bushings 578', 579' are press-fitted over the outer layer 525, of the eddy current shield 512' shown in FIG. 13.

Further details regarding the electrical and structural characteristics of a compulsator including a rotor similar to the rotor 500 are disclosed in W. A. Walls et al., "Design of a 20 GW, Self-Excited, Air-Core Compensated Pulsed Alternator Railgun Power Supply," 1990 International Conference on Electric Machines, MIT, Cambridge, Mass., August 13–15, 1990; and W. A. Walls et al., "Design of a Field Based, Self-Excited Compulsator Power Supply For a 9 MJ Railgun Demonstrator," 5th Symposium on Electromagnetic Launch Technology, Elgin AFB, Florida, Apr. 2–5, 1990; which are incorporated herein by reference.

Turning now to FIG. 19, there is shown an apparatus generally designated 630 especially adapted for making thick multi-section flywheels or rotors of the present invention. The apparatus 630 includes a hydraulic press generally designated 631 and a pair of cylindrical centering plates 632 and 633. As shown in FIG. 19, the centering plates 632, 633 are used to maintain cylindrical sections of a rotor 600 in a coaxial and concentric relationship during the injection and solidification of bonding agent so that the thickness of the resulting bonding layer is everywhere uniform.

In particular, the rotor 600 has a pair of stub shafts 604, 605 having respective cylindrical bearing surfaces 606, 607. The stub shafts 604, 605 are press-fitted or thermally shrink-fitted into a fiber-composite cylinder 608. The assembly of the stub shafts 604, 605 and the fiber-composite cylinder 608 is then turned on a lathe (not shown) so that the bearing surfaces 605, 606 form nearly a perfect cylinder. Moreover, the outer surface of the fiber-composite cylinder 608 is also ground on the lathe to define precisely a cylindrical surface coaxial with respect to the bearing surfaces 606, 607. Then a second fiber-composite cylinder 609 is pressed onto the inner cylinder 607, and the outer surface of the layer 609 is also ground cylindrical and coaxial with respect to the bearing surfaces 606, 607. Then the end plates 632, 633 are used to assemble a cylindrical section 610 in a concentric and coaxial relationship during the injection and solidification of bonding agent to form a continuous annular layer of bonding agent 611 that is of uniform thickness everywhere.

The use of the end plates 632, 633 for concentric and coaxial alignment of cylindrical sections is illustrated in FIG. 19 for the assembly of an outer banding 613 over a cylindrical section 612. Each of the end plates 632, 633 is formed with an internal cylindrical step 634, 635 which abuts against the outer surface of the cylindrical banding 613 when the cylindrical banding expands due to the injection of bonding agent under pressure. Moreover, each of the end plates 602, 603 has a respective inner cylindrical surface 616 having an inner radius just clearing the outer radius of the cylindrical surfaces 606, 607 of the stub shafts 604, 605. Therefore, when the end plates 632, 633 are assembled over the stub shafts as shown and the assembly of the rotor 601 is held within the end plates 632, 633, as shown, then the outer banding 613 is held in a precise coaxial relationship with respect to the cylinder 612 during the injection and solidification of the bonding agent under pressure into the annular region 618 between the outer cylindrical surface of the cylinder 612 and the inner cylindrical surface of the cylindrical banding 613.

In a fashion similar to that described above with respect to FIG. 4, axial end faces of the cylindrical section 612 and the cylindrical section 613 are sealed against the end plates 632, 633 by O-rings 619, 620, 621, 622. To contain the bonding agent under pressure while the bonding agent solidifies, the end plates 632, 633 are clamped against the axial end faces of the cylindrical sections by the hydraulic press 631. The hydraulic press 631 provides a uniform clamping force as hydraulic fluid 637 is pumped by a pump 638 into a cylinder 640, forcing a piston 641 upward against the lower end plate 632 while the upper end plate 633 is constrained by the frame 642 of the press. Sacrificial rings of MYLAR (trademark) polyester film (not shown) or TEFLON (trademark) polytetrafluoroethylene film may be disposed between the end plates 632, 633 and the end faces of the cylindrical sections 612, 613 to facilitate radial movement of the cylindrical sections 612, 613 during the injection of bonding agent such as epoxy with chopped glass fiber.

A pump 623, such as a high pressure grease gun, pumps bonding agent 624 from a reservoir 625 through a check valve 626 and a passage 627 through the lower end plate 632. To ensure that the bonding agent completely fills the annular region 618, the annular region 618 is evacuated prior to injection of the bonding agent 624. For this purpose, a vacuum pump 628 is connected to the annular region 618 via a valve 629 and a passage 643 in the upper end plate 633. After the annular region 618 is evacuated, the valve 629 is closed and then the bonding agent 624 is injected under pressure into the annular region. The check valve 626 ensures that the bonding agent is maintained under pressure until the bonding agent solidifies.

Figure 20:
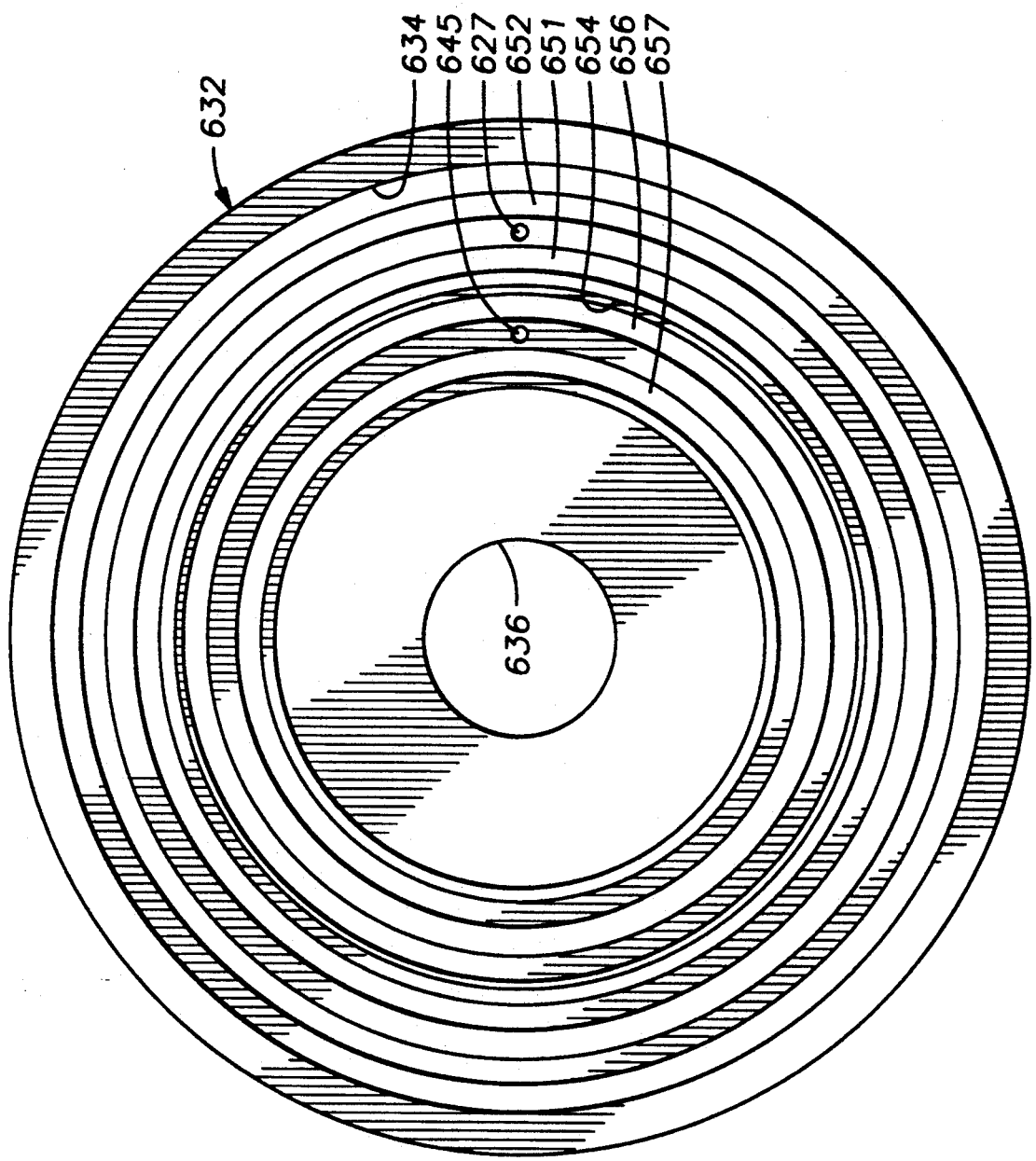
FIG. 20 shows a top view of a cylindrical centering plate used in the apparatus of FIG. 17.

Turning now to FIG. 20, there is shown a top view of the lower end plate 632. From FIG. 20, it is seen that the inner step 634 is concentric with the inner bearing surface 636. Also shown in the end plate 632 are concentric circular grooves 651, 652 which are used to seat the O-rings 621, 622 shown in FIG. 9. Each end plate 632, 633 could be used at different times for maintaining a coaxial and concentric relationship between more than one pair of adjacent cylindrical sections. The end plate 632, for example, has a second inner step 654, a second inlet port 655, and a second pair of circular grooves 656 and 657 for use in assembling the cylindrical section 610 onto the cylindrical section 609 in FIG. 19.

In view of the above, there have been described flywheels and shafts that are particularly useful as rotors in pulsed-power electrical generators. These flywheels and shafts have substantial radial prestress induced by solidified bonding agent. Such radial prestress enables the flywheel or shaft to undergo high-speed rotation without failure. Substantial radial prestress is a characteristic of the flywheel or shaft, and it can be measured by destructive testing. The radial prestress can be computed from the speed at which a flywheel disintegrates. The radial prestress can be measured more directly by radially cutting the rim of the flywheel to determine the change in strain registered by strain gages or otherwise by measuring changes in dimensions of the flywheel as stress is relieved by the cutting operation. An analysis of the materials in the cross-section of the flywheel further relates the radial prestress to a radial displacement, and inspection of the cross-section will indicate whether the radial displacement is caused by a radial interference of parts, as is the case in parts prestressed by a tapered press fit, or whether it is induced by the presence of solidified bonding agent in the product, in accordance with the present invention. In the case of flywheels or shafts having long, thin cylindrical sections, the magnitude of the prestress in relation to the strength of the material may also verify that the magnitude of prestress could not be the result of a press fit, because such a pressing operation would involve shear forces that would have fractured the cylindrical sections.

What is claimed is:

1. An article of manufacture comprising an outer annulus and an inner cylinder disposed in said outer annulus and an annular layer of solid bonding agent under pressure within an annular region between said outer annulus and said inner cylinder, wherein said outer annulus and said inner cylinder include substantial radial prestress, and wherein said annulus includes wound fibers.

2. The article of manufacture as claimed in claim 5, wherein said inner cylinder has an outer cylindrical surface which is not tapered, said outer annulus has an inner cylindrical surface which is not tapered, and said bonding agent is between said outer cylindrical surface and said inner cylindrical surface.

3. The article of manufacture as claimed in claim 5, wherein said bonding agent includes a plastic resin.

4. The article of manufacture as claimed in claim 5, wherein said bonding agent is an epoxy mixture including chopped fibers.

5. The article of manufacture as claimed in claim 1, wherein said layer of bonding agent is relatively thin compared to said annulus and said cylinder.

6. The article of manufacture as claimed in claim 1, wherein said inner cylinder includes an electrically conductive winding, and said outer annulus is a banding for said electrically conductive winding.

7. The article of manufacture as claimed 1, wherein said bonding agent fills said annular region between said outer annulus and said inner cylinder.

8. The article of manufacture as claimed in claim 1, wherein said annular layer of bonding agent has a uniform thickness in radial and axial directions with respect to an axis of said inner cylinder.

9. An article of manufacture comprising an outer annulus and an inner cylinder disposed in said outer annulus, and an annular layer of solid bonding agent under pressure within an annular region between said outer annulus and said inner cylinder, wherein said outer annulus and said inner cylinder include substantial radial prestress, and wherein said inner cylinder is hollow and is comprised of fiber composite material.

10. The article of manufacture as claimed in claim 9, wherein said inner cylinder has an outer cylindrical surface which is not tapered, said outer annulus has an inner cylindrical surface which is not tapered, and said bonding agent is between said inner cylindrical surface and said outer cylindrical surface.

11. The article of manufacture as claimed in claim 9, wherein said bonding agent includes a plastic resin.

12. The article of manufacture as claimed in claim 9, wherein said bonding agent is an epoxy mixture including chopped fibers.

13. The article of manufacture as claimed in claim 9, wherein said layer of bonding agent is relatively thin compared to said annulus and said cylinder.

14. The article of manufacture as claimed in claim 9, wherein said inner cylinder includes an electrically conductive winding, and said outer annulus is a banding for said electrically conductive winding.

15. The article of manufacture as claimed in claim 9, wherein said bonding agent fills said annulus region between said outer annulus and said inner cylinder.

16. The article of manufacture as claimed in claim 9, wherein said annular layer of bonding agent has a uniform thickness in radial and axial directions with respect to an axis of said inner cylinder.

17. An article of manufacture comprising an outer annulus and an inner cylinder disposed in said outer annulus, and an annular layer of solid bonding agent under pressure within an annular region between said outer annulus and said inner cylinder, wherein said outer annulus and said inner cylinder include substantial radial prestress, and wherein said outer annulus includes an outer layer of relatively stiff fiber-composite material, and an inner layer of relatively compliant fiber-composite material.

18. The article of manufacture as claimed in claim 1, wherein said outer layer of relatively stiff fiber-composite material and said inner layer of relatively compliant fiber-composite material are in an integral matrix material.

19. An article of manufacture comprising an outer annulus and an inner cylinder disposed in said outer annulus, and an annular layer of solid bonding agent under pressure within an annular region between said outer annulus and said inner cylinder, wherein said outer annulus and said inner cylinder include substantial radial prestress, and wherein said substantial radial prestress exceeds 1,000 pounds per square inch (psi).

20. An article of manufacture comprising a fiber-composite outer annulus and a fiber-composite inner cylinder disposed in said outer annulus, and an annular layer of solid bonding agent under pressure within an annular region between said outer annulus and said inner cylinder, wherein said outer annulus and said inner cylinder include substantial radial prestress.

21. The article of manufacture as claimed in claim 20, wherein said inner cylinder has an outer cylindrical surface which is not tapered, said outer annulus has an inner cylindrical surface which is not tapered, and said bonding agent is between said outer cylindrical surface and said inner cylindrical surface.

22. The article of manufacture as claimed in claim 20, wherein said inner cylinder is hollow.

23. The article of manufacture as claimed in claim 20, wherein said layer of bonding agent is relatively thin compared to said annulus and said cylinder.

24. The article of manufacture as claimed in claim 20, wherein said inner cylinder includes an electrically conductive winding, and said outer annulus is a banding for said electrically conductive winding.

25. The article of manufacture as claimed in claim 20, wherein said bonding agent fills said annular region between said outer annulus and said inner cylinder.

26. The article of manufacture as claimed in claim 20, wherein said annular layer of bonding agent has a thickness that is uniform in radial and axial directions with respect to an axis of said inner cylinder.

27. The article of manufacture as claimed in claim 20, wherein said outer annulus includes an outer layer of relatively stiff fiber-composite material, and an inner layer of relatively compliant fiber-composite material.

28. The article of manufacture as claimed in claim 27, wherein said outer layer of relatively stiff fiber-composite material and said inner layer of relatively compliant fiber-composite material are in an integral matrix material.

29. The article of manufacture as claimed in claim 20, wherein said substantial radial prestress exceeds 1,000 pounds per square inch (psi).

30. An article of manufacture comprising an outer fiber-composite annulus and an inner fiber-composite cylinder disposed in said outer annulus, and an annular layer of solid bonding agent under pressure within an annular region between said outer annulus and said inner cylinder, wherein said outer annulus and said inner cylinder include radial prestress exceeding 1,000 pounds per square inch (psi), and wherein said outer annulus includes an outer layer of relatively stiff fiber-composite material, and an inner layer of relatively compliant fiber-composite material.

31. The article of manufacture as claimed in claim 30, wherein said outer layer of relatively stiff fiber-composite material and said inner layer of relatively compliant fiber-composite material are in an integral matrix material.

32. The article of manufacture as claimed in claim 30, wherein said bonding agent fills said annular region between said outer annulus and said inner cylinder.

33. The article of manufacture as claimed in claim 30, wherein said layer of bonding agent is relatively thin compared to said annulus and said cylinder.

34. The article of manufacture as claimed in claim 30, wherein said layer of bonding agent has a thickness that is uniform in radial and axial directions with respect to an axis of said inner cylinder.

35. The article of manufacture as claimed in claim 30, including a plurality of concentric layers of solid bonding agent, and a plurality of concentric fiber-composite tubes each having an outer layer of relatively stiff fiber-composite material and an inner layer of relatively compliant fiber-composite material.

* * * * *

UNITED STATES PATENT AND TRADEMARK OFFICE
CERTIFICATE OF CORRECTION

PATENT NO. : 5,285,699
DATED : February 15, 1994
INVENTOR(S) : W. Alan Walls, et. al.

It is certified that error appears in the above-indentified patent and that said Letters Patent is hereby corrected as shown below:

Title page, item [57],

In the Abstract, line 1, change "or" to --of--;

Column 4, line 50, change "of a" to --of an--;

Column 11, line 15, change "us" to --use--;

Column 13, line 34, after "method" add --,--;

Column 14, line 42, after "banding" add --,--;

Column 18, line 15, change "th" to --the--;

Column 29, line 26, after "Rings" add -- 553,--;

Column 29, line 26, delete 555,--;

UNITED STATES PATENT AND TRADEMARK OFFICE
CERTIFICATE OF CORRECTION

PATENT NO. : 5,285,699
DATED : February 15, 1994
INVENTOR(S) : W. Alan Walls, et. al.

It is certified that error appears in the above-indentified patent and that said Letters Patent is hereby corrected as shown below:

Column 30, line 67, change "525", to --525'--;

Signed and Sealed this

Nineteenth Day of July, 1994

Attest:

BRUCE LEHMAN

*Attesting Officer*    *Commissioner of Patents and Trademarks*